United States Patent [19]

O'Callaghan et al.

[11] Patent Number: 5,552,916

[45] Date of Patent: Sep. 3, 1996

[54] DIFFRACTIVE LIGHT MODULATOR

[75] Inventors: Michael J. O'Callaghan, Louisville; Mark A. Handschy, Boulder, both of Colo.

[73] Assignee: Displaytech, Inc., Boulder, Colo.

[21] Appl. No.: 8,764

[22] Filed: Jan. 25, 1993

Related U.S. Application Data

[63] Continuation-in-part of Ser. No. 578,647, Sep. 7, 1990, Pat. No. 5,182,665.

[51] Int. Cl.$^6$ ............................................. G02F 1/13
[52] U.S. Cl. .................. 359/95; 359/73; 359/53; 359/76; 359/78; 359/100
[58] Field of Search ............................... 359/53, 70, 73, 359/75, 89, 94, 95, 100

[56] References Cited

U.S. PATENT DOCUMENTS

| | | |
|---|---|---|
| 3,824,002 | 7/1974 | Beard . |
| 3,843,231 | 10/1974 | Borel et al. . |
| 3,909,114 | 9/1975 | Haas et al. . |
| 4,045,124 | 8/1977 | Pollack et al. . |
| 4,367,924 | 1/1983 | Clark et al. . |
| 4,435,047 | 3/1984 | Fergason . |
| 4,556,289 | 12/1985 | Fergason . |
| 4,563,059 | 1/1986 | Clark et al. . |
| 4,579,423 | 4/1986 | Fergason . |
| 4,596,445 | 6/1986 | Fergason . |
| 4,606,611 | 8/1986 | Fergason . |
| 4,639,091 | 1/1987 | Huignard et al. . |
| 4,813,767 | 3/1989 | Clark et al. . |
| 4,813,771 | 3/1989 | Handschy et al. . |
| 4,840,463 | 6/1989 | Clark et al. . |
| 4,850,681 | 7/1989 | Yamanobe et al. . |
| 4,867,539 | 9/1989 | Goodby et al. . |
| 4,974,941 | 12/1990 | Gibbons et al. . |
| 5,013,141 | 5/1991 | Sakata . |
| 5,182,665 | 1/1993 | O'Callaghan et al. ............... 359/95 |

OTHER PUBLICATIONS

Jones et al., "Shedding light on alignment," Nature vol. 351, May 2, 1991, p. 15.

Patel et al, "Electrically controlled polarization-independent liquid-crystal Fresnel Lens arrays," Optics Letters vol. 16, No. 7, Apr. 7, 1991, pp. 532–534.

Wayne M. Gibbons et al, "Surface-mediated alignment of nematic liquid crystals with polarized laser light," Nature, vol. 351, May 2, 1991, pp. 49–50.

(List continued on next page.)

*Primary Examiner*—Donald T. Hajec
*Assistant Examiner*—Tan Ho
*Attorney, Agent, or Firm*—Cushman Darby & Cushman

[57] ABSTRACT

An arrangement (apparatus and method) for selectively modulating incident unpolarized light passing through a birefringent material, such as ferroelectric crystal. The apparatus includes a plate having one or more birefringent layers corresponding to first and second alignment regions. The birefringent layer corresponding to the first alignment region has a first optic axis selectably set in a first orientation and a second orientation. The birefringent layer corresponding to the second alignment region has a second optic axis selectably set in a third orientation and a fourth orientation. A switching means controls the optical axis states of the birefringent material by applying switching voltages to the areas of the birefringent layer. Light having passed through the birefringent layer at locations having the first orientation has a different phase from, and same polarization as, light having passed through locations with the third orientation, independent of a polarization state of the incident light. As a result, the birefringent material has a uniform state at locations where the corresponding optic axes between the first and second alignment regions are parallel, and a diffracting state produced by an interaction between the light having passed through areas having the first orientation and the light having passed through areas having the second orientation. The arrangement is effective for reflective modulators, multilayer modulators or polarization-preserving modulators, and has applications for intensity modulation, blurring modulation and beam steering.

30 Claims, 14 Drawing Sheets

OTHER PUBLICATIONS

Williams G, et al, "Electrically controllable Liquid Crystal Fresnel Lens, " Proceedings of SPIE, vol. 1168, No. 352–357, et al., Current Developments in Optical Engineering and Commercial Optics, Aug. 1989.

Mochizuki et al, "Elimination of Crosstalk in Highly Multiplexed STN–LCDs by Using Conducting Orientation Films" , SID 90 Digest, pp. 84–87.

Rieker, T. P. et al., "Layer and Director Structure in Surface Stabilized Ferroelectric Liquid Crystal Cells with Non–planar Boundary Conditions, " vol. 6, No. 5, 1989, pp. 565–576.

Nakaya et al, "Electrooptic Bistability of a Ferroelectric Liquid Crystal Device Prepared Using Charge–Transfer Complex–doped Polyimide–Orientation Films" Japanese Journal of Appl. Phys., vol. 28, No. 1, Jan. 1989, pp. L116–18.

Channin et al, "Rapid Turn Off in Triode Optical Gate Liquid Crystal Devices," Applied Physics Letters, vol. 28, No. 6, Mar. 15, 1976, pp.300–302.

Wu et al, "Physical Properties of Diphenyldiacetylenic Liquid Crystals, " J. Appl. Phys., 65(11), Jun. 11, 1989, pp. 4372–4376.

Patel et al, "Alignment of Liquid Crystals Which Exhibit Cholesteric to Smectic C* Phase Transitions," J. Appl. Phys. 59(7), Apr. 1,1986, pp. 2355–2360.

Armitage et al., k "Liquid–Crystal Differentiating Spatial Light Modulator, " Proceedings of SPIE, vol. 613, Nonlinear Optics and Applications, Jan. 1986, pp. 165–171.

Cotts et al, "Appendix F: Compilation of Polymer Conductivity Data," Electrically Conductive Organic Polymers for Advanced Applications, 1986, pp. 176–202.

Doane, J. W. et al, "Polymer Dispersed Liquid Crystals for Display Application " , Molecular Crystals and Liquid Crystals, vol. 165, 1988 pp. 511–532.

Cognard, Jacques, "Alignment of Nemati Liquid Crystals and Their Mixtures ", Molecular Crystals and Liquid Crystals, Supplement Series, 1982, pp. 64–68.

Mao, C. C. et al., "Low Power, High Speed Optical Phase Conjugation Using Chiral Smectic Opticaly Addressed Spatial Light Modulators," Optic News, vol. 15, Sep. 1989, pp. A–38, Abst. TuA4.

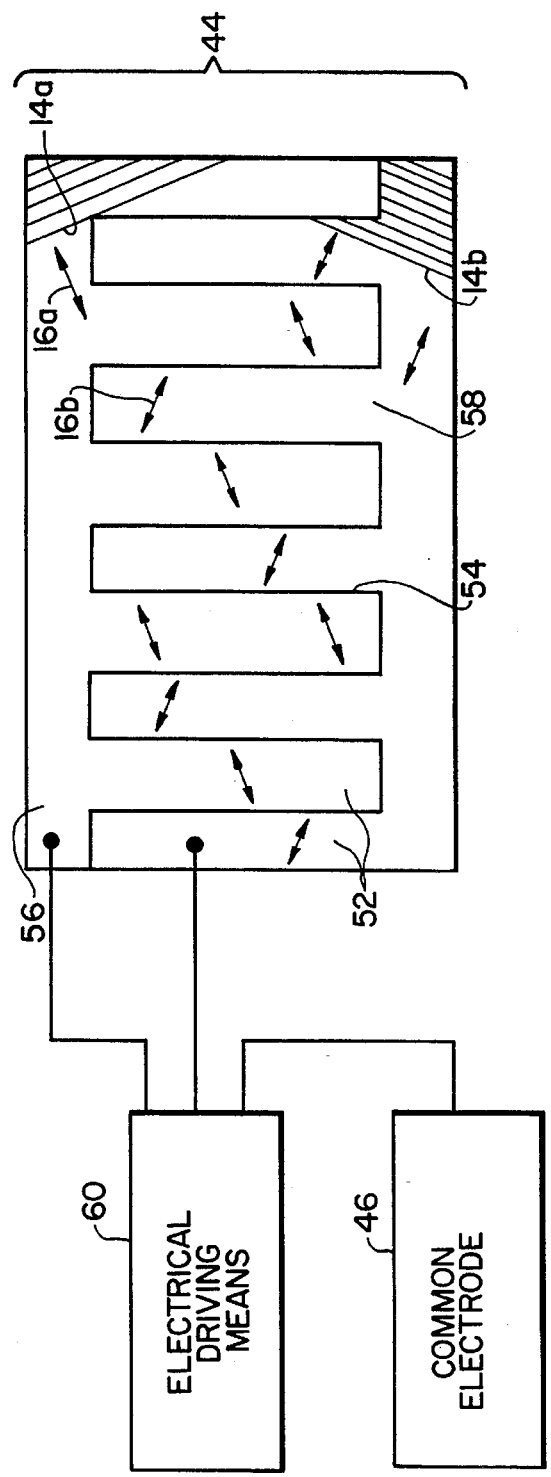
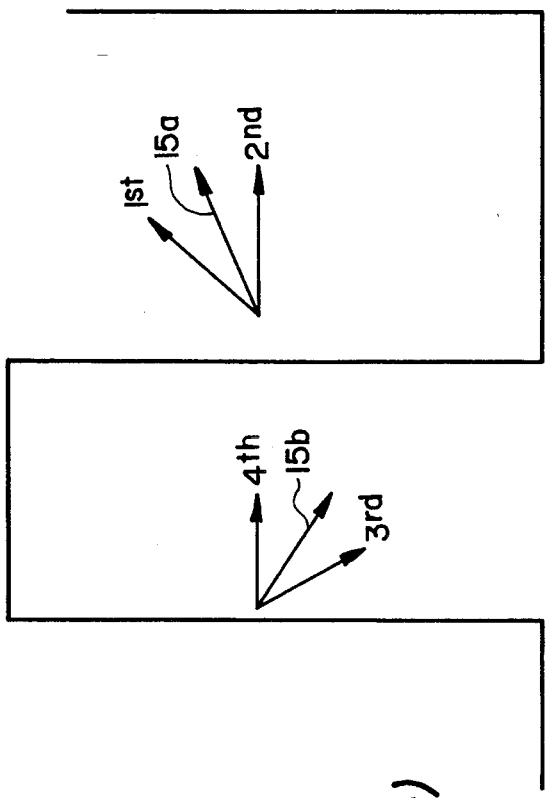
FIG. 5(b)
FIG. 5(c)

FIG. 13A
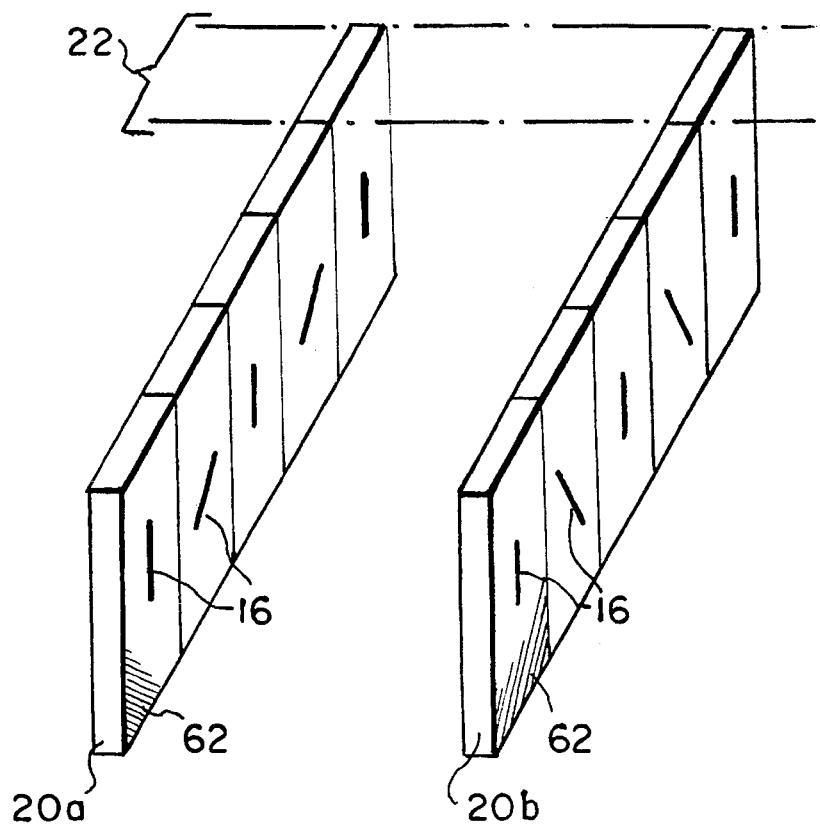
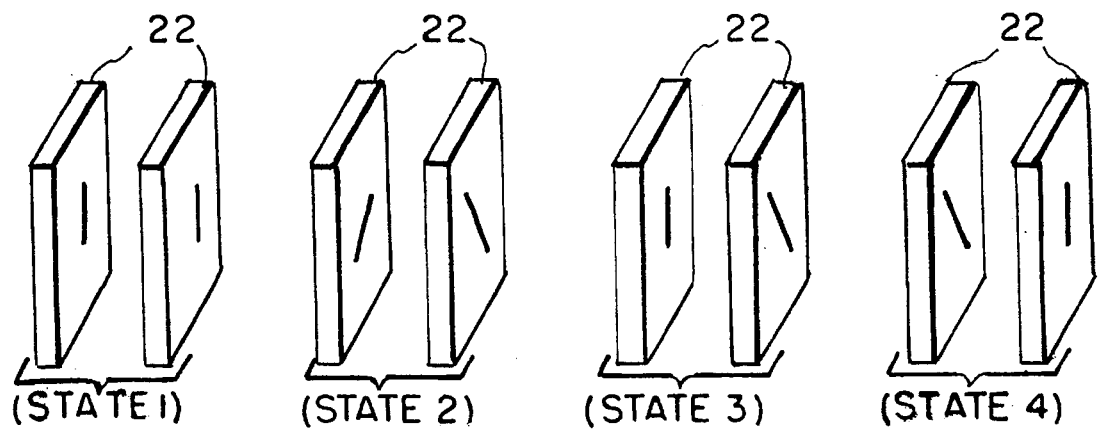
FIG.13B  FIG.13C  FIG.13D  FIG.13E

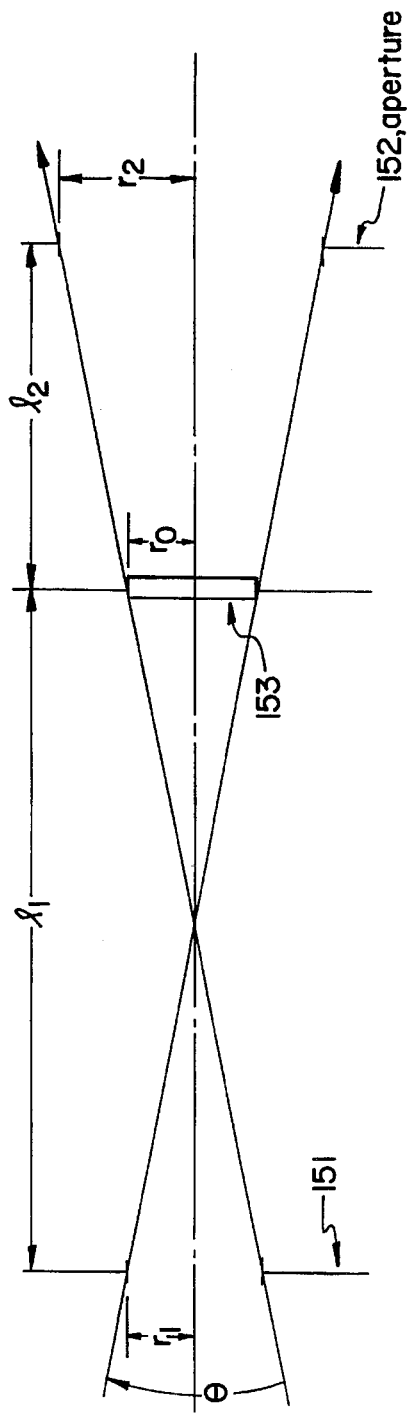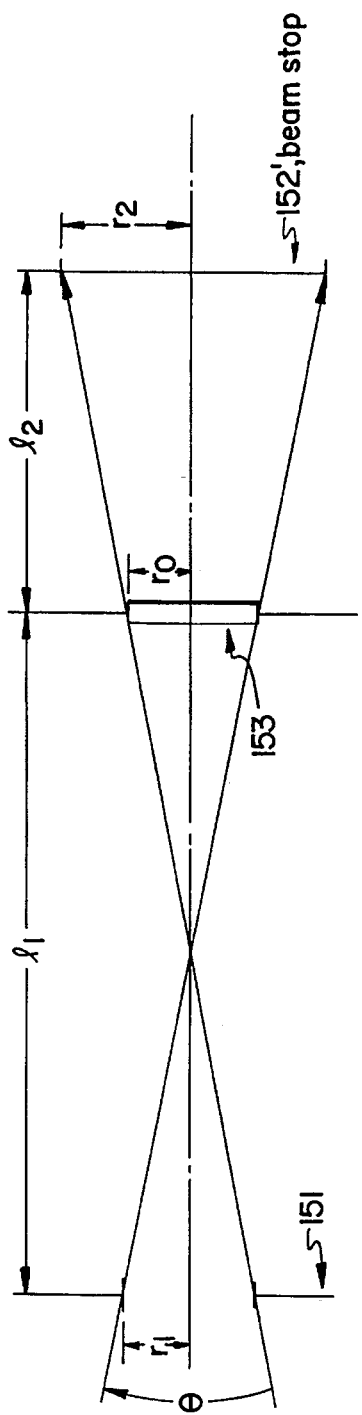

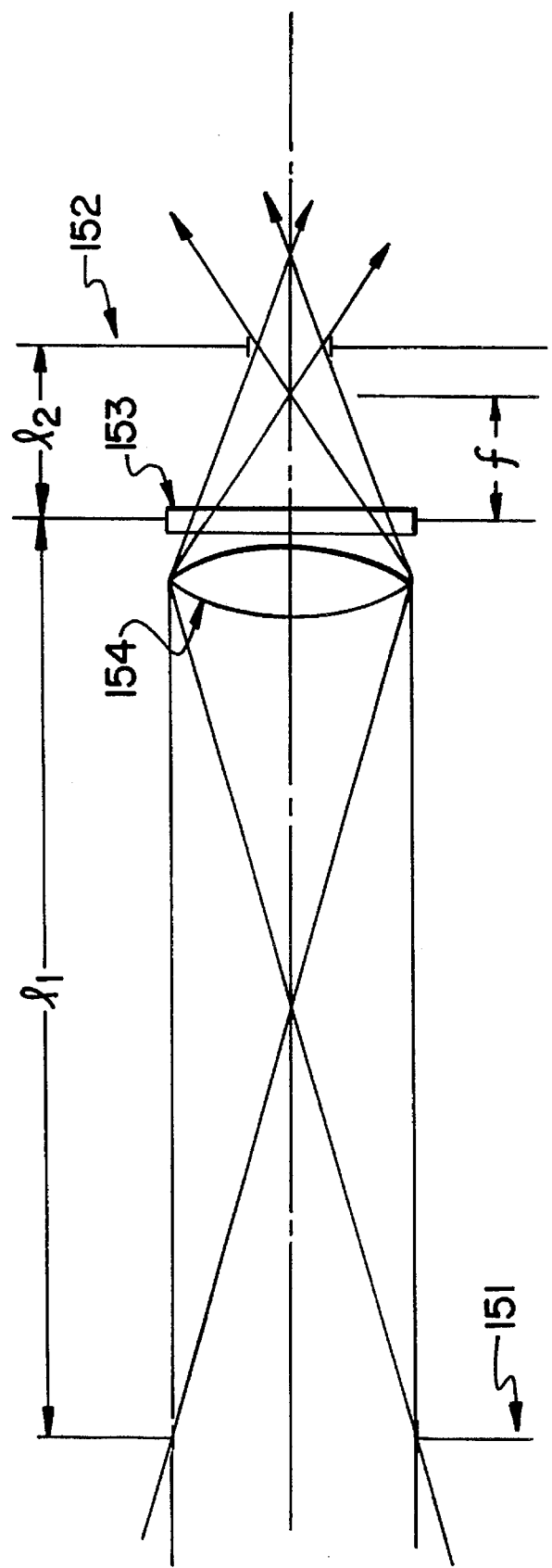

DIFFRACTIVE LIGHT MODULATOR

This is a continuation-in-part application of application Ser. No. 07/578,647, filed Sep. 7, 1990, now U.S. Pat. No. 5,182,665.

BACKGROUND OF THE INVENTION

Government Contract Clause: This invention was made with Government support under contract F29601-89-C-0075 awarded by the U.S. Air Force. The Government may have certain rights in this invention.

FIELD OF THE INVENTION

This invention relates to light modulators which control a light beam in response to external electrical signals. In particular, the present invention relates to a light modulator having an electrically switchable diffraction grating. Such modulators have a variety of uses, for example, as intensity modulators, beam steerers, image-blurring modulators, etc.

DESCRIPTION OF THE ART

There are many examples of light modulators in the prior art. Common types include electromechanical shutters, acousto-optic modulators, and electro-optic modulators. The electromechanical shutters typically use an electric motor or actuator to move an opaque member in or out of the light's path. The acousto-optic modulators diffract light of the refractive index grating produced by a sound wave travelling through a transparent solid. The electro-optic modulators use the effect of electrically-induced refractive index changes to modulate polarized light. Examples of electro-optic modulators are those that use ferroelectric liquid crystals (FLCs) as the modulating medium, as disclosed in U.S. Pat. Nos. 4,367,924, 4,563,059, 4,813,767, and 4,840,463 to Clark and Lagerwall, and in U.S. Pat. No. 4,813,771 to Handschy and Clark. These FLC modulators have the advantage of low-power, low-voltage operation over most electro-optic modulators that use solid materials such as $LiNbO_3$.

The varying characteristics of these modulator technologies gives each certain advantages and disadvantages. The electromechanical modulators have perfect optical characteristics, passing all incident light without attenuation in their open state, and completely stopping all incident light in their closed state. They have the disadvantages of relatively slow switching time (typically not faster than a few milliseconds) and high switching energy. Further, electro-mechanical modulators capable of independently controlling selected parts of their aperture are possible in principle, but difficult in practice because of their complexity and poor reliability.

The acousto-optic modulators are much faster (typical bandwidths of many MHz) and more reliable than mechanical modulators, but they also require high drive power (typically 1 watt) to operate, and again can be made to modulate in selected portions of their aperture only with difficulty.

The electro-optic modulators can also be quite fast, while consuming less drive power than acousto-optic modulators. Electro-optic modulators capable of independently modulating defined portions of their apertures are simply constructed by placing electrode patterns adjacent to the modulating material. This principle is used to make the well-known liquid crystal displays. However, a significant disadvantage of conventional electro-optic modulators is that they only modulate polarized light. Unpolarized light will not be modulated at all by conventional prior-art electro-optic devices. As a result, an unpolarized source must first be polarized, causing at least a 50% loss in intensity, before the light can be modulated by an electro-optic modulator.

Electro-optic modulators that use the principles of light diffraction or light scattering are known in the art, and have the advantage that they can modulate unpolarized light to a lesser or greater extent. For example, U.S. Pat. No. 4,639,091 to Huignard et. al. teaches the use of an electrically switchable grating in nematic liquid crystals. Such a device will diffract one polarization component of an incident unpolarized light beam. A polarization-independent electrically controllable Fresnel lens has been disclosed by G. Williams, N. J. Powell, and A. Purvis, in "Electrically Controllable Liquid Crystal Fresnel Lens," published in *Current Developments in Optical Engineering and Commercial Optics; Proceedings of the SPIE*, vol. 1168, pages 352–357, 1989. This device used two variable-birefringence nematic layers having their alignment directions crossed.

While the Williams et. al. device could completely focus unpolarized light, its two-layer structure would make the fabrication of devices needing fine patterns difficult.

Devices employing liquid crystal droplets embedded in a polymer matrix, such as taught by Ferguson in U.S. Pat. Nos. 4,435,047, 4,579,423, 4,606,611, 4,596,445, and 4,556,289, and by J. W. Doane, A. Golemme, J. L. West, J. B. Whitehead, Jr., and B. G. Wu, in "Polymer Dispersed Liquid Crystals for Display Application," published in *Molecular Crystals and Liquid Crystals*, vol. 165, pages 5112, 1988, can completely scatter unpolarized light by a single layer by virtue of the layer being thick enough that the incident light encounters many randomly oriented liquid crystal droplets. These devices have the drawback that for efficient scattering the liquid crystal droplet must be comparable in size to the light's wavelength. Thus, since nematic liquid crystal switching time increases as the square of the droplet size, these devices become impractically slow when the droplet size is optimized for infrared wavelengths. This disadvantage is shared by the non-droplet nematic devices as well.

Finally, diffractive modulators using FLCs have been disclosed, for example by C. C. Mao, K. M. Johnson, G. Moddel, K. Arnett, and M. A. Handschy at the 1989 Annual Meeting of the Optical Society of America, held Oct. 15–20 in Orlando, Fla. (abstract published in *Optics News*. vol. 15, September, 1989, page A-38, abstract TuA4). The device disclosed by Mao et. al. used the fringe pattern produced by two interfering coherent light beams to activate an amorphous silicon photosensor, which in turn switched an adjacent FLC film. Thus, the incident interference pattern was replicated into a grating in the FLC. Mao et. al. diffracted polarized laser light off this grating. The diffraction efficiency varied strongly with time after the applied electronic drive signal made the amorphous silicon photosensitive, increasing from zero to a peak value, and then declining back to zero again. However, the peak value was always small.

SUMMARY OF THE INVENTION

The principal object of the present invention is to provide an electro-optic light modulator capable of completely modulating unpolarized incident light.

Another object of the present invention includes providing a light modulator capable of effecting modulation over a selected portions of its apertures.

Still another object of the present invention is to provide a light modulator capable of rapidly modulating light, even when the light has a relatively long wavelength.

Ferroelectric liquid crystals are desirable electro-optic materials because of their strong optical interaction arising from their large, permanent birefringence ($\Delta n>0.1$) and their microsecond switching time in response to low applied voltages. Since FLC switching depends on the sign of the applied electric field the FLCs can be driven ON as well as OFF, and hence need not suffer from the slowness that affects most thick nematic liquid crystal devices. As described earlier, thick nematic liquid crystal devices have a refractive index which varies with the polarization direction of the light, so that their most straightforward applications as light modulators require polarized light.

The present invention shows that FLCs can be used to make switchable diffraction gratings that, when properly constructed, completely diffract unpolarized incident light. The switchable diffraction grating according to the present invention includes two plates and a birefringent layer between the two plates which includes an optic axis having two selectable optic axis orientation states. The two orientations both make substantially the same angle to the perpendicular to the plates. When light passes through the birefringent layer at locations having the first orientation state, the light has a different phase from light which has passed through locations of the birefringent layer having the second orientation state. As a result of this phase difference, diffraction is produced by an interaction between the light having passed through the first orientation and the light having passed through the second orientation.

This diffraction takes place without disturbing the polarization states of the light. Specifically, the light passing through locations having the first and second orientations of the birefringent layer have substantially the same polarizations, independent of the polarization state of the incident light and independent of whether the incident light falls on the area of the birefringent layer having the first or second orientation.

These orientations of the optical axis of the birefringent material can be controlled to either be parallel or at an angle (e.g., perpendicular). When the optical axes are in parallel throughout the birefringent material, the incident light passes through with no modulation in phase. However, when the optical axes are at an angle, diffraction occurs.

The orientations of the optical axes are controlled by groups of electrodes which are controlled by an electrical driving means. These groups of electrodes can be independently controlled, enabling a variety of diffraction patterns. As a result, the diffractive light modulator of the present invention is effective in a variety of applications, including intensity modulation, blurring modulation and beam steering.

In addition, the orientation of the optical axes are aligned in accordance with the FLC alignment direction. The light modulator can have an alignment pattern that comprises different alignment regions each effecting the respective FLC alignment. Thus, the optic axes can be oriented according to both the corresponding FLC alignment region and the groups of electrodes.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, of which:

FIG. 5(b) shows a face view of an electrode pattern of a low-tilt FLC grating according to another embodiment of the present invention;

FIG. 5(c) is an enlarged view of a portion of FIG. 5(b).

FIGS. 13A–13E show the construction of an eighth embodiment of the present invention employing two FLC films;

FIGS. 15(a), 15(b), and 15(c) show intensity modulators incorporating the diffractive light modulator of the present invention;

DETAILED DESCRIPTION OF THE PREFERRED EMBODIMENTS

Modulator Concept

Figure 1A:
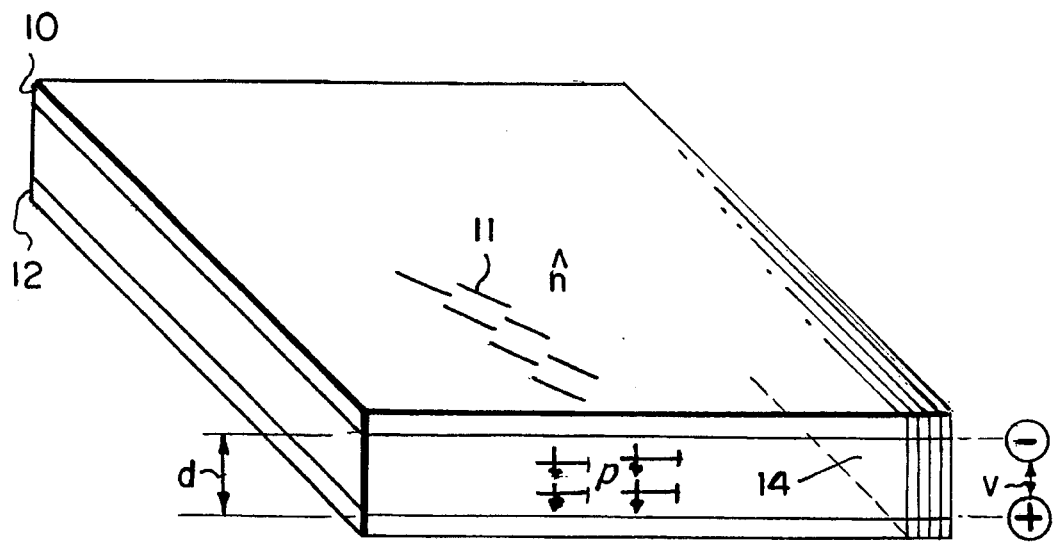
FIGS. 1A and 1B are schematic representations of a prior-art FLC device which has a film of smectic C* liquid crystal between transparent electrode plates.
Figure 1B:
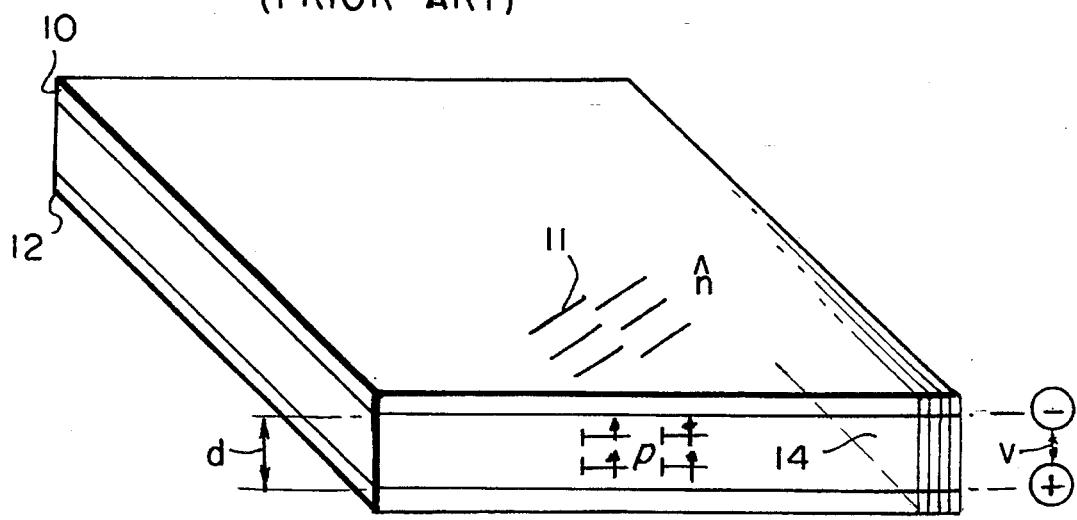

The geometry of the standard prior-art ferroelectric liquid crystal (FLC) electro-optic device is shown in FIG. 1A and 1B. A film of smectic *C liquid crystal is located between two parallel electrode plates 10 and 12 and is made up of smectic layers 14. Voltages applied between the plates 10 and 12 produce electric fields perpendicular to the plates (hereafter longitudinal), whereby the direction of the applied field reverses when the sign of the applied voltage changes. As shown in FIGS. 1A and 1B, the selected FLC optic axis 11 ($\hat{n}$) lies in the plane of the electrode plates 10 and 12 (hereafter transverse) at a different orientation depending on the applied field direction. Also, the ferroelectric polarization ($\vec{P}$) changes orientation depending on the applied field direction.

Whereas the birefringence in conventional electro-optic devices is induced by the applied field, the birefringence of the FLC device is permanent and is produced by the field-induced rotation, in the transverse plane, of the optic axis. In spite of its differences from conventional electro-optic devices, the FLC device of FIG. 1A and 1B shares the property of requiring polarized light to produce modulation.

Figure 2:
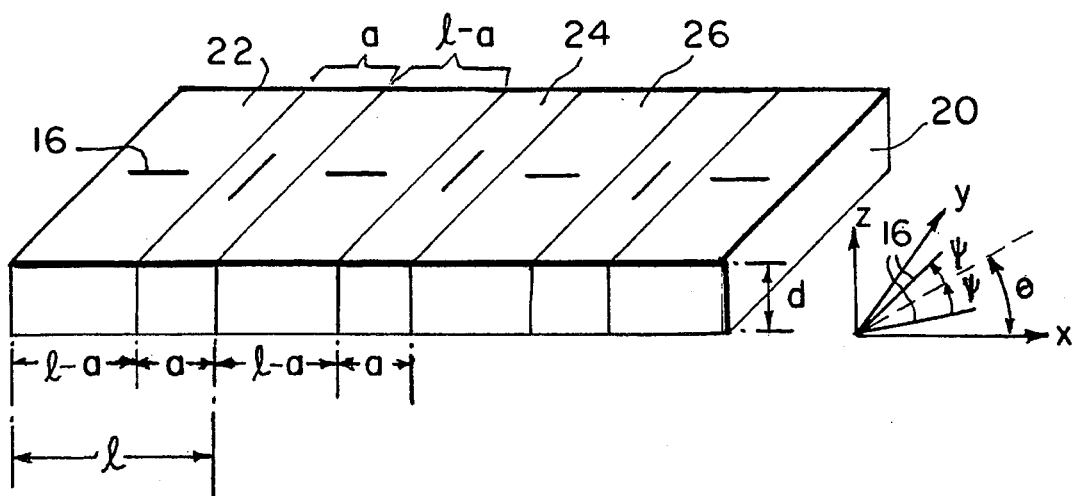
FIG. 2 is a schematic representation of a diffraction grating formed in an FLC film according to an embodiment of the present invention.
Figure 6:
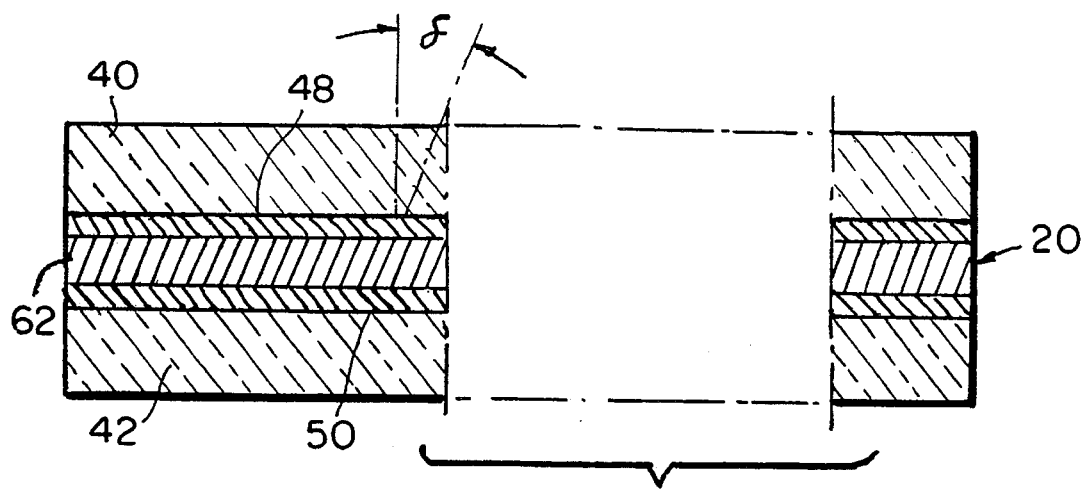
FIG. 6 shows a modulator with tilted smectic layers from plates with obliquely evaporated alignment layers in the antiparallel configuration according to a second embodiment of the present invention.

FIG. 2 shows, in a schematic style, an FLC device that modulates unpolarized light according to the present invention. A film 20 of FLC having a thickness d is divided into strips 22 along a grating axis x, with each strip being switchable into either of two optic axis states 16. FIG. 2 assumes that the smectic layer normal lies parallel to the face of film 20, i.e., in the x–y plane; however, since the smectic layer may be tilted as shown in FIG. 6, reference numeral 16 is more precisely defined as the projection of the optic axis states onto the plane x–y. The angle θ in FIG. 2 is defined as the angle between the projection of the FLC smectic layer normal and the grating axis x. The width of the strips alternate between a and l-a, producing a spatially periodic pattern with period l. Although for clarity only a few strips are shown, in fact the device works best when the strip widths are small, as explained in more detail below, so that in practice the device may comprise many strips. The strips 22 are made up of a first region 24 having the width a, and a second region 26 having the width l-a. When the first region 24 and the second region 26 both have the same optic axis orientation, then the FLC film 20 forms a uniform, birefringent window. When the first region 24 has the opposite optic axis state from the second region 26, then the FLC film 20 forms a grating, which can diffract incident light.

Figure 3:
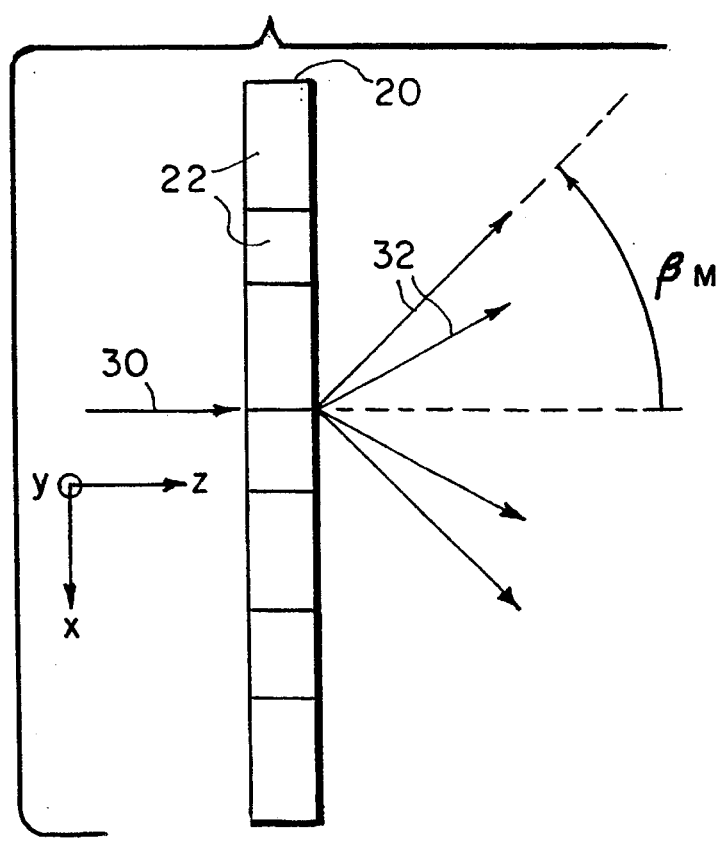
FIG. 3 shows the diffraction of light off the FLC grating of FIG. 2.

FIG. 3 shows the FLC film 20 and an incident ray 30. Since the optical change from one strip 22 to the next is sharp, the incident ray 30 is diffracted into many orders of diffracted rays 32, with the diffraction angle $\beta m$ of the $m^{th}$ order being defined by the usual relation $$\sin\beta m = m\lambda/l, \quad (1)$$

where λ is the vacuum wavelength of the light.

Although the effect produced on an incident light beam 30 by a strip in either state depends on the polarization of the incident beam, the intensity pattern of the diffracted light 32 depends only on the differences between the effects produced by the strips in the two different optic axis states. Since the effect of this difference is independent of the incident polarization state, the diffraction of the grating state of the film is also independent of the polarization state of the incident light. As a result, the diffracting device can diffract even unpolarized light. Of course, the uniform film produces no sensible effect (at least without a polarization analyzer) on incident light of any polarization state.

Since the diffraction of light is produced by interference of the rays passing through the first region with rays passing through the second region, the diffracted intensity is maximized when the two sets of rays interfere to the maximum extent. This in turn occurs when their polarization state is most nearly the same. Thus, maximal diffraction occurs when the light passing through the first region differs only in phase, ideally by an amount of π radians, or an odd integral multiple thereof, from light passing through the second region. Although a polarization-independent phase grating is usually implemented as a relief grating in an optically isotropic material, we teach below how it can in fact be implemented in switchable, optically anisotropic electro-optic ferroelectric liquid crystals (FLCs).

To produce maximum diffraction efficiency, the FLC film thickness d should be such that the film forms a half-wave plate, i.e., such that $\Delta nd/\lambda=\frac{1}{2}$, where Δn is the birefringence of the plate. Further, the strips should be of equal width (a=l/2), and the angle between the selected FLC optic axis states (2ψ) should be 90°. The optical properties of the modulator can be appreciated in more detail using the Jones calculus for anisotropic optics well known in the art. Here, the incident and transmitted light electric field amplitudes, $\vec{E}_i$ and $\vec{E}_o$, respectively, are related by the matrix equation $$\begin{pmatrix} E_{ox} \\ E_{oy} \end{pmatrix} = W \begin{pmatrix} E_{ix} \\ E_{iy} \end{pmatrix} \quad (2)$$

where the actual electric fields $\epsilon$ depend on the amplitudes E as $$\vec{\epsilon}_i = \vec{\epsilon}_i e^{i(kl-wt)}; \quad \vec{\epsilon}_o = \vec{\epsilon}_o e^{i(kl-wt)}, \quad (3)$$

with the wavevector k defined as $k=2\pi/\lambda$. In the above representation, the waveplate lies parallel to the x–y plane, with the light propagating along z at normal incidence. The simple FLC device of FIGS. 1A and 1B has the Jones matrix $$W(\phi) = \begin{pmatrix} e^{-i\Gamma/2}\cos^2\phi + e^{i\Gamma/2}\sin^2\phi & (e^{-i\Gamma/2} - e^{i\Gamma/2})\sin\phi\cos\phi \\ (e^{-i\Gamma/2} - e^{i\Gamma/2})\sin\phi\cos\phi & e^{-i\Gamma/2}\sin^2\phi + e^{i\Gamma/2}\cos^2\phi \end{pmatrix}, \quad (4)$$

where φ is the angle between the optic and coordinate axes. The angular retardance Γ is determined by the light wavelength λ, waveplate thickness d, and birefringence Δn as $\Gamma=2\pi\Delta nd/\lambda$. The device of the present invention shown in FIG. 2 has a transmittance alternating between $W_1=W(\theta+\psi)$ and $W_2=W(\theta-\psi)$ with period l. This transmittance can be described as a Fourier series, $$W(X) \equiv \sum_{m=-\infty}^{+\infty} \omega_m e^{2\pi i m a/l}; \quad (5)$$

each term in the series produces a diffracted wave travelling in a different direction given by equation (1). The coefficient of the $m^{th}$ term is given by:

$$\omega_m = \begin{cases} (1/2)[(W_1 + W_2) + (W_1 - W_2)(2a/l - 1)] & m = 0 \\ (i/2\pi m)(W_1 - W_2)(1 - e^{-2\pi i m a/l}) & m \neq 0. \end{cases} \quad (6)$$

Making a=l/2 permits the amplitude of the undiffracted wave (m=0) to be reduced to zero by making $W_1=-W_2$. In fact, using the form of W in equation (4) gives, for a=l/2, the transmittance term producing the undiffracted wave as:

$$\omega_0 = \begin{pmatrix} \cos(\Gamma/2) - i\sin(\Gamma/2)\cos\theta\cos 2\psi & -\sin(\Gamma/2)\sin\theta\cos 2\psi \\ -\sin(\Gamma/2)\sin\theta\cos 2\psi & \cos(\Gamma/2) + i\sin(\Gamma/2)\cos\theta\cos 2\psi \end{pmatrix} \cdot \quad (7)$$

For an incident monochromatic plane wave, the fraction $I_o/I_i$, of the incident optical power $I_i$ undiffracted is then $$I_o/I_i = 1 - \sin^2(\Gamma/2)\sin^2 2\psi \quad (8)$$

and the fraction diffracted in the $m^{th}$ order is $I_m/I_i = [4/(m\pi)^2](1-I_o/I_i)$.

This shows that for equal strip widths, $2\psi=90°$ between the two FLC optic axis states, and half-wave thickness ($\Gamma=\pi$), the device of FIG. 2 produces a $\pi$ phase shift between alternate strips, and thereby completely diffracts incident light, modulation of even unpolarized incident light. For incident light of appreciable spectral width, i.e., non-monochromatic, the device will not in general be an exact half-wave plate for all the incident wavelengths. However, if the thickness d is chosen to make the film half-wave for a wavelength $\lambda_0$ near the middle of the incident light's spectrum, the modulator can still diffract substantially all of the incident light if the spectral width is not too broad, as can be seen from how slowly equation (8) varies near its first minimum. For light of narrow spectral band, the modulator will work equally well when its thickness is such as to produce any odd-integral multiple of half-wave retardance.

FLC Cell Construction

Figure 4:
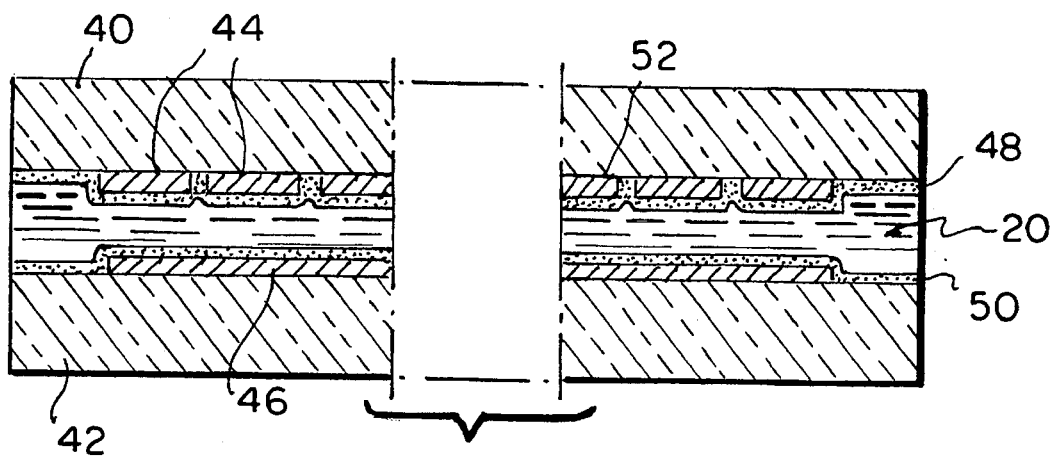
FIG. 4 shows in cross section the structure of an FLC diffractive modulator.

A cross section of a structure implementing the modulator of FIG. 2 is shown in FIG. 4. The modulator comprises two transparent plates 40, 42, each coated with a transparent electrode layer 44 and 46 and a liquid crystal alignment layer 48 and 50. For use of the modulator in visible light, the plates 40 and 42 could favorably be made of glass, or polymer. For use in the infrared, the plates 40 and 42 could be made of one of the many infrared-transparent materials known in the art, such as the semiconductors silicon, germanium, gallium arsenide, or the insulators zinc selenide, zinc sulphide, sapphire, etc. On the insulating substrates the electrodes 44 and 46 could be deposited layers of indium-tin oxide, as are commonly used in the art to form electrodes transparent to visible and infrared light, with the further favorable property that they can conveniently be patterned by photolithographic etching techniques well known in the art. Alternately, for use in the infrared, deposited layers of doped semiconductors such as silicon or germanium could be used for the electrodes 44 and 46. On the semiconducting substrates the electrodes could be made by the techniques known in the integrated circuit art of dopant diffusion, ion implanting, or epitaxial growth of doped layers. Again, photolithographic techniques are known for making such electrodes according to a desired pattern.

The liquid crystal alignment layers 48 and 50 might typically be a thin layer of polymer film which has been rubbed in a single direction with a cloth, or be a thin layer of obliquely vacuum-deposited silicon oxide. The plates 40 and 42 are faced together to form a gap which contains the FLC film 20. The gap spacing can be defined by spacer particles distributed throughout the gap or confined to the seal ring.

As shown in FIG. 4, the electrode layer 46 on one plate is continuous, and forms the common electrode, while the electrode layer 44 on the other plate is patterned into stripes 52 to allow electric fields alternating in direction to be applied to alternate strips 22 of the FLC film.

Figure 5A:
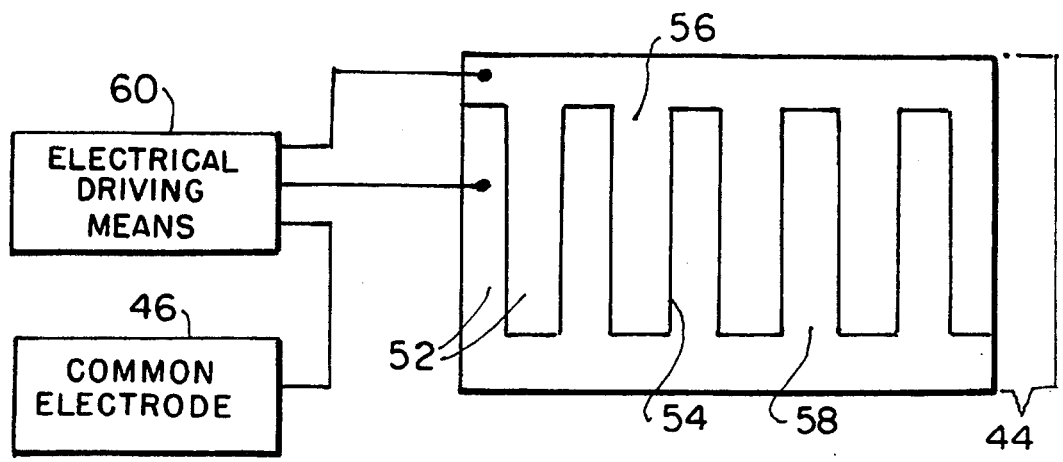
FIG. 5(a) shows a face view of an electrode pattern of the FLC grating of FIG. 2.

FIG. 5(a) shows a face view of the electrode pattern of FIG. 4 to produce the FLC strips of FIG. 2. The electrode layer 44 is divided up into stripes 52 by a thin insulating gap 54, shown here as a black line. The stripe electrodes 52 are connected together into a first group 56 and a second group 58 which are then both connected to electrical driving means 60 along with the common electrode 46, such that, according to the state of the driving means 60, both groups of electrode strips 56 and 58 can have the same voltage relative to the common electrode, or the voltage on the two groups 56 and 58 can be of opposite sign, so that the voltage on the stripes spatially alternates in sign relative to the common electrode 46. The light to be modulated is directed so that it passes through the transparent plates 40 and 42 and FLC film 20. When the state of the driving means 60 is such that both groups of electrodes 56 and 58 have the same sign of voltage relative to the common plate 46 then the FLC film 20 is in its uniform state, and the light passes through undiffracted. When the driving means 60 produces opposite signs of voltage on the two groups of electrodes relative to the common plate 46 then the alternate stripes 52 are switched to opposite optic axis states, and the device is in its grating state, diffracting the incident light. The techniques for forming the conductive and alignment layers, for spacing and sealing the liquid crystal cell formed from the two plates, and for formulating suitable liquid crystal materials are well-known in the art, and are described in much greater detail in various references known to those skilled in the art. While these techniques are generally applicable to the present invention, certain differences of the present invention from those devices of the prior art favor some variations from the standard techniques, which we now describe.

Favorable FLC Materials and Their Alignment

Ferroelectric liquid crystals materials suitable for use in the modulator are commercially available, for example the material ZLI-3654 from E. Merck in Darmstadt, Federal Republic of Germany. This material has tilt angle $\psi$ approximately 22°, and hence is sufficient to diffract approximately half of incident unpolarized light according to equation (8). However, with a single FLC layer aligned in the most common ways that produce smectic layers normal or nearly normal to the plates, the modulator will give better performance with higher tilt materials, such as the material CS-2004 from Chisso Corporation of Yokohama, Japan, which has $\psi \approx 45°$, which permits substantially complete diffraction. Low-tilt FLC materials, such as ZLI-3654, typically have the phase sequence in order of decreasing temperature of Isotropic (I) to chiral Nematic (N*) to smectic A (A) to chiral smectic C (C*) where the utilized electro-optic effects occur in the ferroelectric smectic C* phase. High-tilt FLC materials, however, typically have the phase sequence I to N* to C*, i.e., they have no smectic A phase. This complicates their alignment, as the smectic layers which form as the material is cooled from the N* phase into the C* phase are not required to take any unique direction relative to the alignment layer and its rubbing direction. Solutions to this problem are taught by Goodby and Patel in U.S. Pat. No. 4,867,539 and in their article published in the *Journal of Applied Physics*, vol. 59, no. 7, pages 2355–2360, Apr. 1, 1986. They teach that applying an electric field while cooling across the N* to C* phase transition in a cell with conventional alignment layers will suffice to promote good alignment.

An alternate technique substitutes a magnetic field for the alignment layers. If a magnetic field is applied parallel to the plane of the plates and an electric field is applied perpendicular to the plates while the liquid crystal is slowly cooled (e.g., 1 mK/s.) from the N* to the C* phase, alignment results. The magnetic field should preferentially be strong enough to unwind the N* director helix. The magnetic field technique can be used in conjunction with surface alignment layers, with the magnetic field preferentially directed parallel to the rubbing direction of the alignment layers.

The angle $2\psi$ between the projection of the two optic axis orientations onto the plane of the plates 40 and 42 is close to the FLC tilt angle $\psi_0$ between the optic axis and the smectic layer normal only when the smectic layers are, as usual, nearly perpendicular to the plates; however, the angle $2\psi$ increases as the layers tilt away from the perpendicular to the plates. If the layers tilt by an angle $\delta$, then the effective tilt angle is given by $$\tan \psi = \tan \psi_o / \cos \delta. \tag{9}$$

Thus, alignment techniques that produce sufficiently tilted layers improve the performance of low-tilt materials in the instant modulator. As is well known in the art, the standard alignment techniques generally produce tilted layers through the phenomenon of chevron formation, but for typical low-tilt FLC materials the resulting layer tilts only produce $\delta \approx 18°$, which increases their effective tilt angle over their characteristic $22°$ tilt only by about $1°$. However, increasing the layer tilt to $\delta=65°$ would increase the effective tilt angle of a material with characteristic tilt $\psi_0=22°$ to the desired $45°$. Techniques for producing FLC cells with tilted layers have been disclosed in the art, e.g., by T. P. Rieker, N. A. Clark, G. S. Smith, and C. R. Safinya, in "Layer and Director Structure in Surface Stabilized Ferroelectric Liquid Crystal Cells with Non-Planar Boundary Conditions," published in *Liquid Crystals.* vol. 6, pages 565–5765 (1989), who teach the use of obliquely evaporated oxide alignment layers.

After depositing the alignment layers 48 and 50, the two plates, 40 and 42 are assembled so that their evaporation directions are antiparallel, as shown in FIG. 6. FIG. 6 shows the direction of the alignment layers 48 and 50 along which the evaporation source was located during their fabrication; the FLC film 20 includes the smectic layers 62 having a layer tilt $\delta$. Other alignment techniques that produce "tilted homeotropic" alignment of nematics, such as are taught by Jacques Cognard in *Alignment of Liquid Crystals and Their Mixtures.* (Gordon and Breach, New York, 1982) pp. 67–68, will permit higher layer tilts.

Patterned FLC Alignment

The previous discussion of FLC cell construction and of FLC materials and their alignment has assumed that the FLC alignment direction, and hence the FLC smectic layer normal, is uniform across the light modulator. Thus, applying a voltage of the same sign to two different regions nevertheless produces the same optic axis orientation in the two regions. However, it is not necessary that the FLC alignment direction be the same from region to region. In fact, by making devices wherein the alignment direction follows a desired pattern, the more common and easily aligned low-tilt FLC materials can still yield switchable diffraction gratings with $90°$ stripe-to-stripe optic axis variation.

Techniques for producing alignment patterns in the liquid crystals are known in the art. For example, J. S. Patel and K. Rastani have shown in "Electrically Controlled Polarization-Independent Liquid-Crystal Fresnel Lens Arrays," published in *Optics Letters,* vol. 16, pp. 532–534, Apr. 1, 1991, that liquid crystal devices with patterned alignment can be produced using conventional photolithography. In the method disclosed by Patel and Rastani, a polymer-coated substrate was first rubbed uniformly, as is conventionally done. Then the substrate was coated with photoresist which was exposed and developed to uncover substrate regions where a different alignment direction was desired. The substrate was then rubbed again in a different direction, redefining the alignment direction in the exposed regions, while the remaining photoresist protected regions where the original alignment direction was preferred. Finally, the unexposed photoresist was removed, leaving a substrate with a pattern of two different alignment directions. Patel and Rastani used this technique to make a diffractive device with nematic liquid crystals. This device differs from the FLC devices of the present teaching in that to turn the diffraction of the nematic device off requires switching its optic axis orientation to be everywhere substantially perpendicular to the substrate.

Another technique for producing liquid crystal alignment patterns was disclosed in U.S. Pat. No. 4,974,941 to Gibbons et. al. They teach that alignment of liquid crystals, including FLCs, on polymer films can be induced by exposing a liquid crystal cell to linearly polarized light at a wavelength where either the liquid crystal itself, the polymer, or a dye component of either the liquid crystal or polymer absorbs. The alignment direction is controlled by the direction of the producing light's polarization. Alignment patterns can be produced simply by passing the aligning-producing light through a mask which is then imaged onto the liquid crystal cell substrate, as Gibbons et. al. demonstrated in "Surface-Mediated Alignment of Nematic Liquid Crystals With Polarized Light," published in *Nature,* vol. 351, pp. 49–50, May 2, 1991.

By using patterned alignment, diffraction gratings with optic axis orientations switchable up to $90°$ between stripes, as preferred for the present invention, can be made with FLC materials switching through only $45°$. The construction of such a device is described with reference to FIG. 5(*b*). The FLC cell construction remains the same as described before with reference to FIG. 4. Again, the liquid crystal is aligned by alignment layers 48 and 50. Now, rather than the alignment direction being uniform throughout the device, the alignment layers are patterned using, for example, one of the techniques described above.

FIG. 5(*b*) shows how an alignment pattern registered to the electrode stripes 52 permits the more common low-tilt FLC materials to be used to realize a $90°$ switchable grating. The FLC overlying the first group of electrodes 56 has the alignment of its smectic layers 14*a* in one indicated orientation 15*a*, while the FLC overlying the second set of electrodes 58 has the alignment of its smectic layers 14*b* in a different indicated orientation 15*b*, differing from that over the first electrodes by about $45°$. The selectable optic axis projection orientations lie preferably $22°$ on either side of the orientations 15*a* and 15*b* in each of the two FLC regions, respectively.

FIG. 5(*c*) is an enlarged view of part of FIG. 5(*b*). FIG. 5(*c*) illustrates the first and second orientations of optic axis orientation 15*a*, respectively labelled 1st and 2nd, as well as the third and fourth orientations of optic axis orientation 15*b*, respectively labelled 3rd and 4th.

When the electrical driving means 60 applies a voltage of the same sign to both electrode groups, the optic axis projection 16 differs from strip to strip by the same amount as the alignment directions differ from stripe to stripe, in this case by about $45°$, regardless of whether the voltage sign is positive or negative. As a result, the device diffracts about half of the incident light. However, if the voltage applied to the first electrode group 56 has the opposite polarity from the voltage applied to the second electrode group 58, then the optic axis projection orientations will differ by either substantially zero or substantially 90°, depending on which group is positive. As a result, the device can be switched from substantially non-diffracting to substantially completely diffracting.

Therefore, uniform state is obtained by one alternating voltage pattern, in distinction to the previously described modulators with uniform alignment, where the uniform state was obtained by applying the same voltage to both first and second groups of electrodes.

To minimize the diffraction in the uniform state, the optic axis should vary in that state by the least amount from stripes of the first group to strips of the second group. This is effected by making the difference between the alignment directions in the first group and the second group equal to the angle between the FLC optic axis states selected in a single group by opposite signs of applied voltage, i.e. the alignment directions should differ by $2\psi$. In this case, a pattern of applied voltages that alternate from stripe to stripe in the way opposite the alternating pattern that produces the uniform state will produce a diffracting state where the optic axis projections differ from stripe to stripe by $4\psi$. The equation corresponding to equation (8) that now describes the undiffracted fraction of incident light is then $$I_o/I_i = 1 - \sin^2(\Gamma/2)\sin^2 4\psi \qquad (10)$$

This diffracting state will have the highest efficiency when $\psi = 22.5°$; however, the light that remains undiffracted by the diffracting state depends only weakly on $\psi$ for values near 22.5°, as shown by equation (10). Thus, the many commercially available FLC materials with $\psi$ in the range 15°–30° can be used to make modulators that diffract at least 75% of the incident light.

Electrodes and Their Patterns

For many applications it is desirable to increase the diffraction angle $\beta_m$ as much as possible. This is accomplished by reducing the size of the switched FLC regions 24 and 26, as is seen from equation (1). The thickness of the FLC film 20 sets a lower limit on how small completely—switchable transverse regions in film may be. If the electrode layer 44 is patterned into regions smaller than the film is thick, then the fringing of the fields when the device is switched to the grating state may prevent regions of the film near the common electrode 46 from switching. The thinnest FLC film capable of producing complete diffraction is one half-wave thick, i.e., $d = \lambda/2\Delta n$. If the smallest switchable region is limited in transverse size to the film thickness d, then the smallest spatial periodicity will be 2d, and the largest achievable first-order diffraction angle will be determined by $\sin \beta_{1_{max}} = \Delta n$. Thus, for modulators where large diffraction angles are desired, highly birefringent FLC materials are preferred. High-birefringence FLCs can be synthesized using similar molecular structures and techniques as those taught for nematics by Shin Tson Wu et. al. in "Physical Properties of Diphenyldiacetylenic Liquid Crystals," published in the *Journal of Applied Physics*. vol. 65, no. 11, pages 4372–43 One way to form electrode patterns of independently switching adjacent FLC regions is to pattern an electrically conducting layer into separated but adjacent electrodes 56 and 58, as described with reference to FIGS. 5(a) and 5(b). It is necessary to leave small gaps 54 between adjacent electrodes to prevent short circuits. In general, the FLC state will not be controlled in the portion of the film adjacent the electrode gap 54, which will cause light to pass through the device unmodulated. Two techniques can be used to prevent this occurrence. First, as described above, fringing fields prevent electrode features smaller in size than film thickness from being faithfully replicated in the FLC film. Thus, if the electrode gaps 54 can be made small compared to the film thickness, the longitudinal extent of the unswitched region will be negligible. Alternately, it is taught by D. J. Channin and D. E. Carlson in "Rapid Turn-Off in Triode Optical Gate Liquid Crystal Devices," published in *Applied Physics Letters*. vol. 28, no. 6, pages 300–302, Mar. 15, 1976, and by David Armitage and John I. Thackara, in "Liquid-Crystal Differentiating Spatial Light Modulator," published in *Nonlinear Optics and Applications; Proceedings SPIE*, vol. 613, pages 165–171, 1986, that coating an electrode pattern with a slightly conductive layer promotes switching of the liquid crystal over the gap. The upper limit to useful conductive film resistances is set by the liquid crystal resistance, while the lower limit is set by the tolerable electrical power dissipation when adjacent electrodes are at different voltages. Films of adequate conductivity, yet sufficiently resistive as to produce negligible power dissipation, may be made by depositing semiconductors such as amorphous silicon or carbon over the electrode pattern on the transparent, insulating substrate. Furthermore, many slightly conductive polymers are known in the art, for example as taught by Akihiro Mochizuki, Toshiaki Yoshihara, and Yasuhiro Yoneda, in "Elimination of Crosstalk in Highly Multiplexed STN-LCDs by Using Conducting Orientation Film," published in the *SID 90 Digest*, pages 84–87, 1990, and by K. Nakaya, B. Y. Zhang, M. Yoshida, I. Isa, S. Shindoh, and S. Kobayashi in "Electrooptic Bistability of a Ferroelectric Liquid Crystal Device Prepared Using Charge-Transfer Complex-Doped Polyimide-Orientation Films," published in the *Japanese Journal of Applied Physics*, vol. 28, no. 1, pages L116–L118, January, 1989, and by David B. Cotts and Zeila Reyes in *Electrically Conductive Organic Polymers for Advanced Applications*, (Noyes Data Corporation, Park Ridge, N.J., 1986) pages 176–202, and may also be used to form slightly conductive layers.

Figure 7:
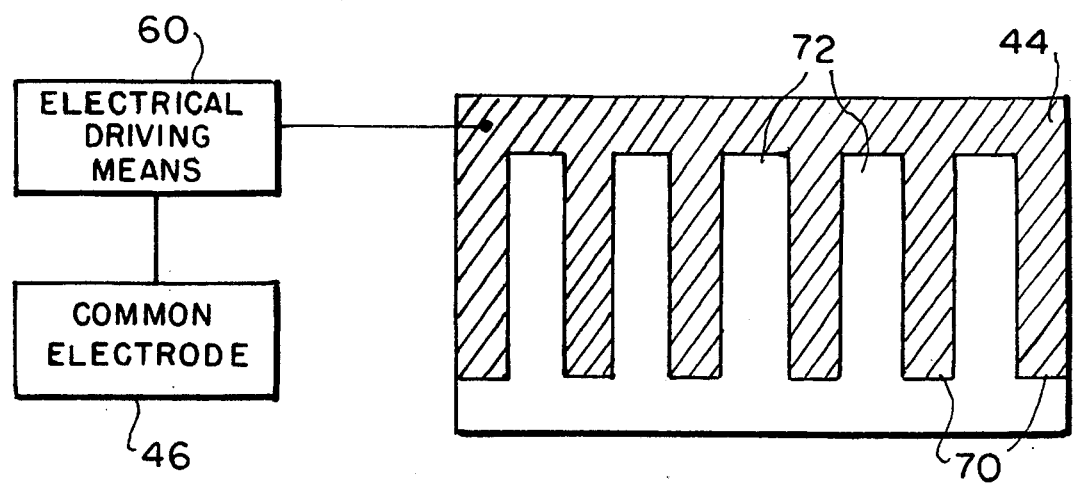
FIG. 7 shows the construction of a switchable-grating modulator with an electrode pattern that covers only one region according to a third embodiment of the present invention.

Switchable gratings with simpler electrode patterns can be made only by using alignment techniques that give a certain FLC orientation in the absence of applied electric field. As a result only half the strips need electrodes, as shown in FIG. 7. The electrode layer 44 covers only a first region 70. Thus, the FLC strips over the region 72 are passive. Depending on the voltage applied by the electrical driving means 60 the switchable strips 70 will either have substantially the same state as the passive strips 72 or the opposite state from the passive strips 72. The electrode layer 44 must be thin compared to the device's operating wavelength to prevent diffraction off the relief grating formed. This effect is reduced if the refractive index of the electrode layer 44 nearly matches that of the FLC.

Figure 8:
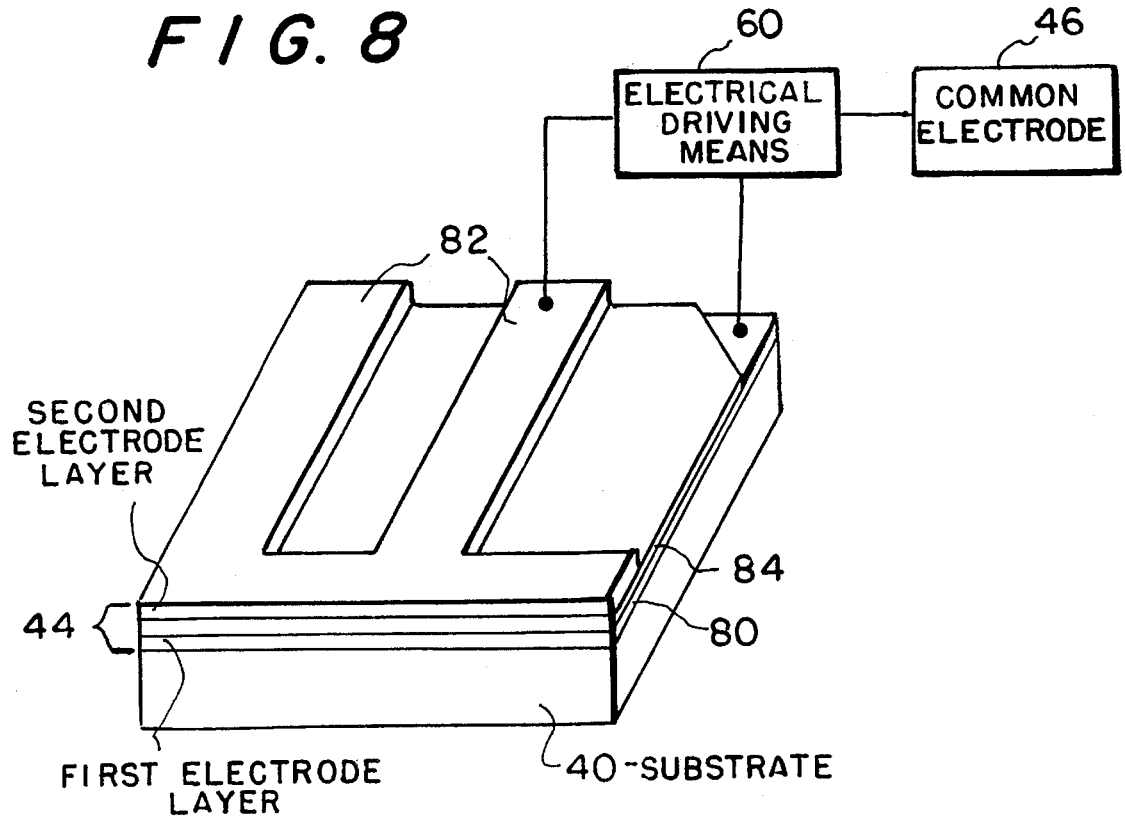
FIG. 8 shows an electrode arrangement according to a fourth embodiment of the present invention comprising a uniform electrode layer adjacent the substrate topped by a second patterned electrode layer, with an insulating layer between the first and second electrode layers.

A third useful electrode construction is shown in FIG. 8. Here, two electrode layers are used, one patterned, one not, separated by an insulating layer. The first, unpatterned layer 80 is deposited directly on the substrate, followed by the insulating layer 84, which is in turn followed by the second electrode layer 82, which is then patterned. Voltages of opposite sign relative to the common electrode 46 are connected to the first and second electrode layers 80 and 82. Thus, at locations where unpatterned electrode layer 80 is covered by the patterned electrode layer 82, the electric field direction in the FLC is determined by the sign of voltage on the patterned electrode layer 82. At locations where the unpatterned electrode layer 80 is uncovered, the sign of its voltage determines the direction of the electric field in the FLC. This construction has the advantage that, even with lithographic techniques of limited resolution, all regions have an electrode. As mentioned above, the patterned electrode layer 82 should be thin or of nearly the same refractive index as the FLC to prevent unwanted diffraction in the uniform state of the modulator.

FIG. 4 shows two groups of electrodes, with electrodes of one group alternating with electrodes of the other group. Assuming the FLC alignment of FIG. 5(a), when both groups of electrodes are at the same voltage relative to the common electrode 46 the whole aperture of the modulator is in the nondiffracting state, while when one electrode group has the opposite voltage sign relative to the other group the whole aperture of the modulator is in the diffracting state.

Figure 9:
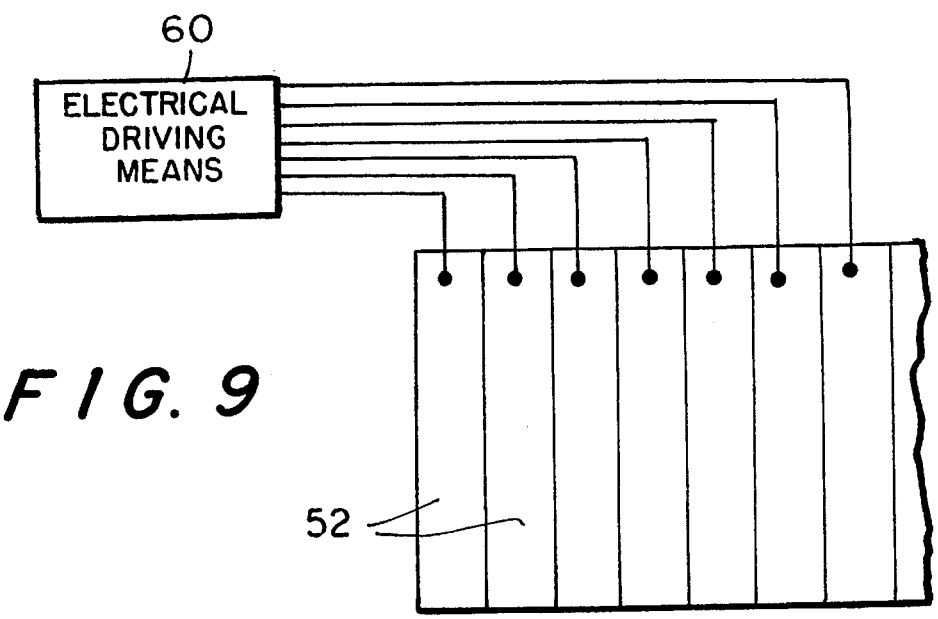
FIG. 9 shows an electrode pattern where the voltage of each electrode, and hence of each overlying FLC strip, can be controlled independently of the others according to a fifth embodiment of the present invention.

Other arrangements are possible. As shown in FIG. 9, the voltage state of each individual electrode stripe 52 can be controlled independently by having one connection between each electrode stripe 52 and the electrical driving means 60. Then the groupings of electrodes can be determined electronically within the electrical driving means 60. Thus, chosen portions of the aperture of the modulator can be made uniform and nondiffracting by making the stripes that cover those portions all have the same sign of applied voltage relative to the common electrode, while other portions can independently be made diffracting by making the stripes that cover those portions spatially alternate their sign of applied voltage.

Figure 10:
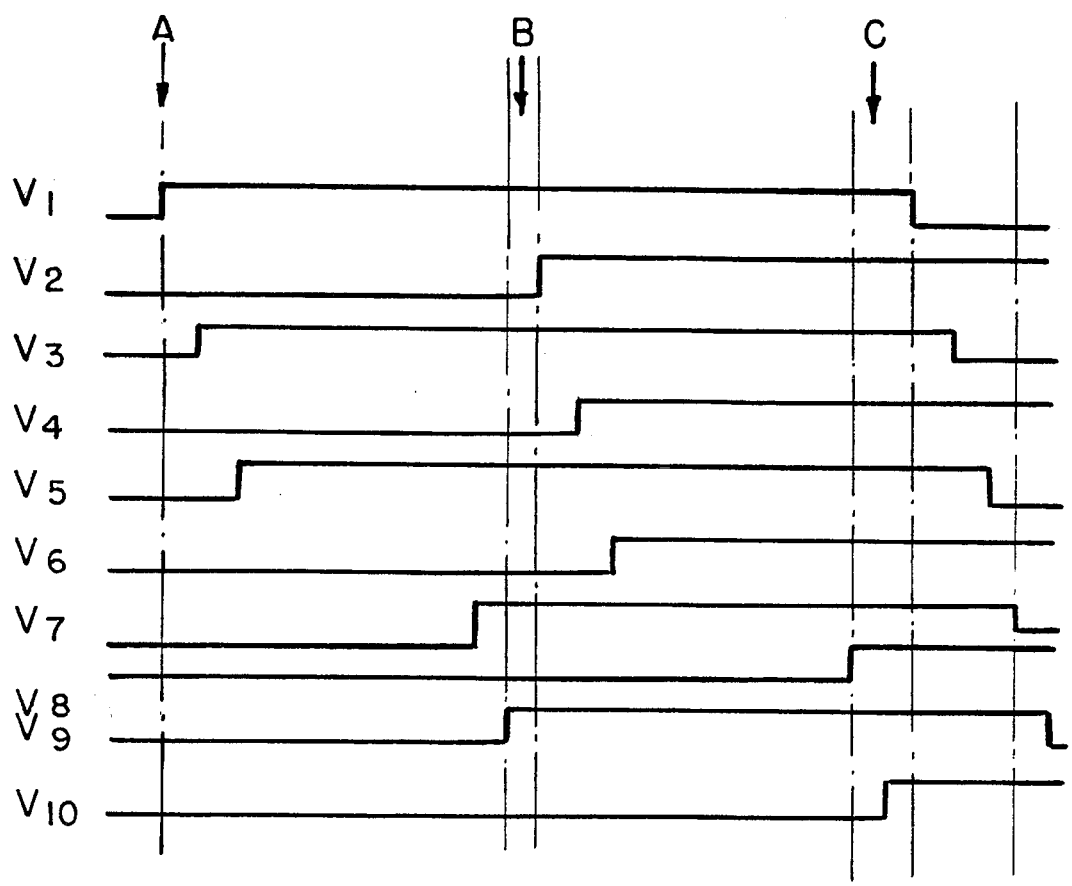
FIG. 10 is a waveform pattern for alternately scanning a modulator of the present invention into its uniform (nondiffracting) and grating (diffracting) states.

For some applications it is advantageous if the modulator aperture can be scanned. This can be accomplished by driving each stripe 52 of an electrode pattern such as that shown in FIG. 9 with a periodic waveform, but with the phase offset from one electrode to the next, as illustrated in FIG. 10. FIG. 10 shows a waveform pattern for alternatively scanning the modulator of the present invention into its uniform (nondiffracting) and grating (diffracting) states. Here, $V_i$ refers to the voltage applied to the $i^{th}$ stripe, where the stripes are numbered so that given stripe's index differs from the stripes next to it by one; for simplicity we assume the modulator has an even number N of stripes. The modulator is initially in its uniform state A, with the voltages on all stripes negative. Then the first electrode is switched positive, then the third, then the fifth, etc. This causes a boundary between the uniform region and the grating region to move across the modulator until the whole modulator is in its grating state B when the $N-1^{st}$ stripe is switched positive. Then, the second stripe is switched positive, then the fourth, etc. This causes a boundary between the grating region and the growing uniform region to move across the modulator in the same direction that the first boundary moved, until the whole modulator is once again uniform at state C when the Nth stripe is switched positive. Then the whole process of switching first the odd stripes and then the even stripes is repeated, only now from positive back to negative voltage. This driving method has the advantage that the average voltage on every stripe can be made zero, which is generally regarded to increase the lifetime of liquid crystal devices.

The modulators have all been depicted so far as having straight, parallel strips. This produces diffraction in the single plane perpendicular to the long axes of the strips. Other electrode patterns can produce more complex diffraction patterns.

Figure 11:
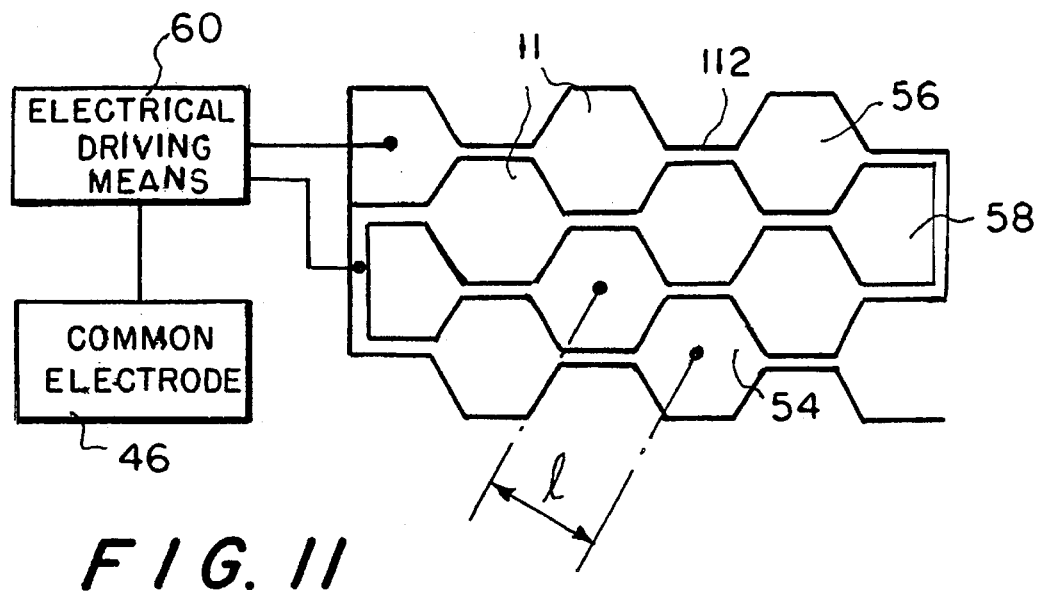
FIG. 11 shows an electrode pattern for producing hexagonal diffraction patterns according to a sixth embodiment of the present invention.

The "honeycomb" pattern shown in FIG. 11 produces diffraction in a hexagonal pattern. The insulating gap 54 separates the conducting regions 56 and 58. The thin "necks" 112 permit the entire pattern to be driven from connections at its edge. The diffraction will occur in a hexagonal pattern as well, with the angle between the incident direction and the diffracted rays being given by equation (1), with twice the center-to-center distance between hexagons being substituted for l. For some applications it is desirable that the diffracted light be diffusely scattered rather than diffracted into some well-defined angle. This can be accomplished by a two-dimensional electrode pattern with elements placed pseudo-randomly. Since it is convenient to make connections to the electrode pattern only at the edge of the aperture, the elements will have to be connected by thin necks like those connecting the hexagons 111 in FIG. 11. To enable complete diffraction of incident light by the grating state of the modulator, the electrode pattern must permit equal areas of the FLC film to be switched into each of the two optic axis orientations. Thus, any independently switchable section of the aperture should have its two sets of electrodes of equal area. In any case, the diffraction intensities for a given electrode pattern can be predicted by Fourier transforming the modulator transmittance which spatially varies between $W_1$ and $W_2$ as given by equation (4) and following.

The most straightforward way of switching the FLC film into either the grating or uniform state is to use an electrode layer made with a fixed pattern, as described above. A more versatile alternative is to use a layer that can selectively apply voltage to the FLC film in response to selective illumination. A variety of devices called liquid crystal light valves that accomplish this are known in the art, such as taught in U.S. Pat. No. 3,824,002. Light valves particularly incorporating FLCs are described in U.S. patent application Ser. No. 364,073 to Model and Handschy, issued as U.S. Pat. No. 5,178,445, hereby incorporated by reference. Using these devices, a pattern of bright and dark incident on one side of such a device will be converted to a grating pattern in the FLC layer which then diffracts light according to the above description.

Optical Configurations

Modulators for a variety of alternate optical configurations can be built using the modulator concepts described above.

Reflective modulators.

Figure 12:
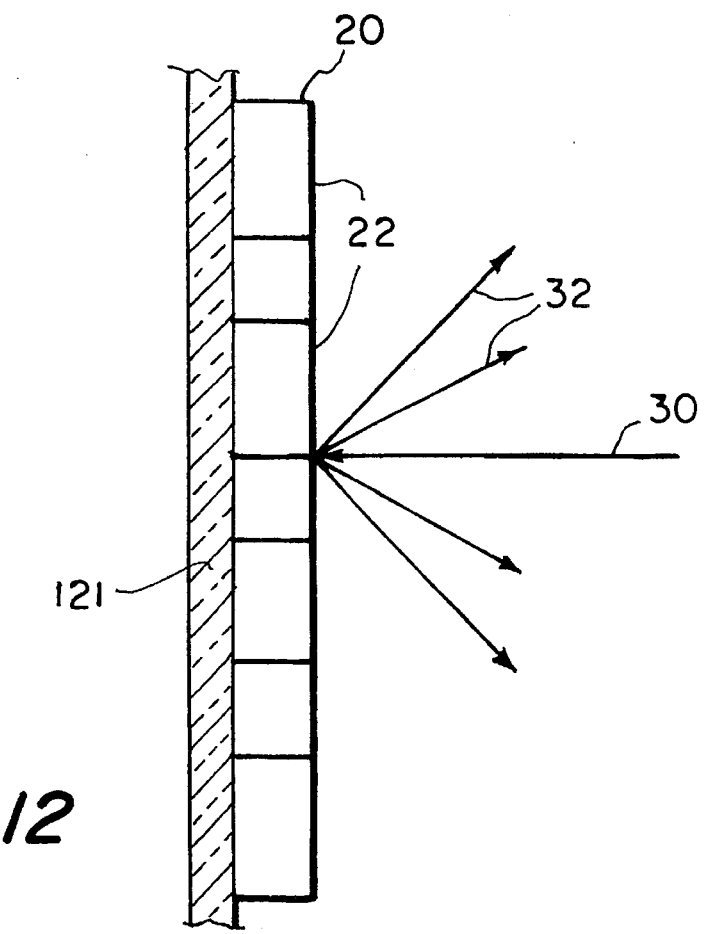
FIG. 12 shows a diffractive modulator configured to operate in reflection according to a seventh embodiment of the present invention.

The modulator concept has been described above as a transmissive device. It can work equally well as a reflective device, an example of which is shown in FIG. 12. Here, the incident light 30 passes once through the FLC film 20, strikes a reflector 121, and is returned again through the FLC film 20. Since the retardance produced increases on each pass through the device, the FLC film 20 should be half as thick as in the transmissive device, i.e., its retardance at the center of the operating wavelength range should be one-quarter wave, or some odd-integral multiple thereof. To minimize parallax effects, the reflector 121 should be close to the FLC film 20. This is conveniently accomplished by making a device of structure similar to that shown in FIG. 4, and substituting a reflective material such as a deposited metal layer for one of the electrode layers. Either (but only one) of the patterned layer 44 or common electrode layer 46 can be the reflective layer. Then, the reflective electrode layer serves double duty as the reflector 121. Techniques for vacuum depositing and photolithographically patterning metal suitable metal layers are well known in the art. Aluminum or silver layers are appropriate for visible light modulators, while gold layers are appropriate for infrared light modulators. This modulator has the advantage that, since the FLC layer 20 need only be half as thick as for the transmissive device, the smallest switchable FLC features can also be twice as small. This permits diffraction angles twice as large, or such that $\sin \beta_{1_{max}} \approx 2\Delta n$.

Multilayer modulators.

Advantageous embodiments of the above FLC diffractive concept may employ more than one FLC film, or combinations of FLC films with passive retarder plates. As described with respect to FIG. 2, the desired polarization-independent π phase shift requires substantially 90° between the projections of the optic axis in alternate strips onto the plane of the FLC film. By combining two FLC films 20a and 20b as shown in FIGS. 13–13E, the same effect producing complete diffraction of polarized light can be realized with FLC films 20 where the projected angle between the two switched optic axis states is only 45°. Separately, except for the angle between optic axis states, each FLC film 20a and 20b is more or less similar to the single FLC film 20 of FIG. 2: each produces half-wave retardance, and each can be switched so that either the optic axis state is uniform across the film or the optic axis state alternates on alternate strips. Furthermore, the pattern of switchable regions is identical in the two films, and they are registered with each other as shown so that the patterns line up. The films are spaced apart in FIGS. 13A–13E merely for clarity; in practice the two films would be placed close together. The two films differ in that their alignment directions are offset by substantially 45°, so that the smectic layers 62 in the two films are differently oriented. Any given strip 22 constituted of two FLC films can now have four distinct optical states. In the first state shown in FIG. 13B, both films 20a and 20b are switched so their optic axes are parallel. In the second state shown in FIG. 13C, the films are switched so their optic axes differ in projection by substantially 90°. In FIGS. 13D and 13E, respectively, the third and fourth states of the films are switched so their optic axis orientations differ by 45°. When the entire aperture of the modulator is all in any one state, no diffraction takes place. When the state of the modulator alternates from the first state to the second state from region to region, then complete diffraction of unpolarized incident light takes place, as before.

Figure 14A:
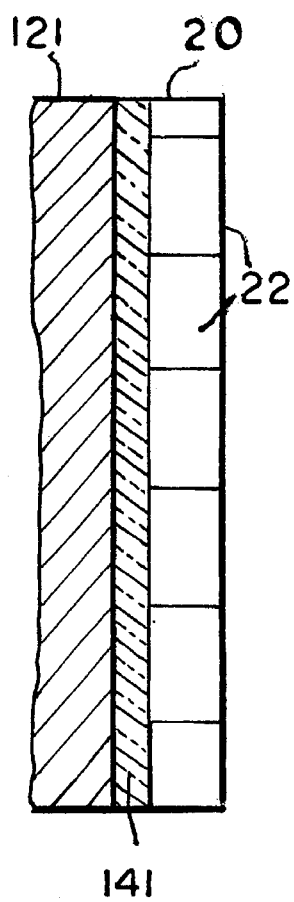
FIGS. 14(a) and 14(b) show a ninth embodiment of the present invention including a reflective modulator incorporating a single FLC film with 45° switching between optic axis states, and a compound mirror comprising a reflector and a quarter-wave plate.
Figure 14B:
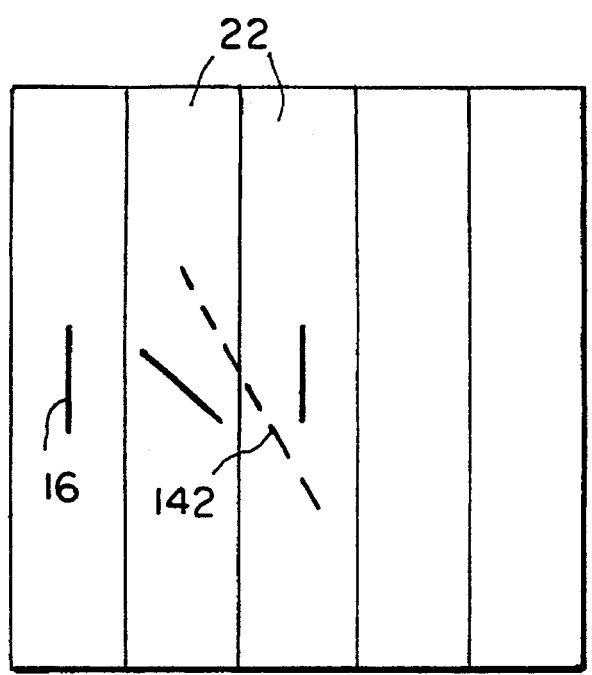

A single FLC film with 45° switching between optic axis states can similarly be used to make a reflective modulator, as shown in FIGS. 14(a) and 14(b). Here, the FLC has the full half-wave (or odd—integral multiple thereof) thickness, and is placed adjacent to a reflector 121. The reflector is now not just a simple mirror, but includes in addition a passive waveplate 141. As shown in FIGS. 14(a) and 14(b), this waveplate is a quarter-wave thick, and is oriented with its axis 142 parallel to the bisector of the two selectable FLC optic axis states 16. When all the elements are switched to the same state (either one), then the device acts as a uniform birefringent reflector, and no diffraction takes place. When every other element is switched to the opposite FLC optic axis state, the device acts as a grating. The combination of the passive waveplate with the mirror causes the light to accumulate the same phase shift on its two passes through the FLC film as it would on a single pass through the device with two FLC films described immediately above. Thus, again, polarization-independent π phase shifts resulting in complete diffraction can be produced.

Polarization-preserving modulators.

While the above modulators all modulate polarized or unpolarized incident light equally effectively, the changes they produce in the polarization state of polarized incident light may be disadvantageous in some applications. Simply adding an appropriately oriented passive waveplate to the modulator can restore the light's initial polarization state. The net effect is to make the modulator effectively a whole-wave plate or a zero-wave plate. This can be accomplished for the simple modulator with $2\psi=90°$ described above with reference to FIG. 2 by adding a half-wave plate oriented with its axis along either of the selectable FLC axis directions. The fixed wave plate can be placed on either between the source of incident light and the modulator, or with one modulator between the waveplate and the light source. For the reflective modulator described above with respect to FIG. 12 a quarter-wave plate is used, oriented again with its axis parallel to either of the FLC axis states. It can be placed either between the modulator and the reflector, or with the modulator between it and the reflector. The modulators described above with respect to FIGS. 13 and 14(a)–14(b) are already polarization—preserving as described.

Specific Applications

Intensity modulator.

The modulators described above principally work by changing the direction of the incident light. This can be used to produce the useful function of intensity modulation by a suitable arrangement of apertures and other optical elements. Intensity modulation is most straightforward when then light to be modulated comprises a bundle of rays with an angular spread limited to an angle θ that is less than the first-order diffraction angle $β_1$. In this case a modulator system can be made that in one state passes substantially all of the incident light and in another state blocks substantially all of the incident light.

Such a modulator system is shown schematically in FIG. 15(a). It comprises a diffractive modulator element 153 and two apertures 151 and 152. The diffractive modulator element 153 is surrounded by an opaque screen (not shown). The first aperture 151 or "field stop" serves to limit the angular spread of the incident light to an angle θ. If the field stop aperture 151 has radius $r_1$, and is placed a distance $l_1$ away from the diffractive modulator element 153 which itself has radius $r_0$, then θ is determined by $$\tan(\theta/2) = \frac{r_0 + r_1}{l_1} \tag{11}$$

The second aperture 152 is located on the opposite side of the diffractive element 153 at a distance $l_2$. When the diffractive modulator element 153 is in its uniform state, the incident light passing through the field stop 151 is passed by the diffractive modulator element 153 with its direction unchanged. If the second aperture 152 has a large enough radius $r_2$, whereby $r_2$ is greater than $r_0+l_2\tan(\theta/2)$, all the light passing through the diffractive modulator element 153 will pass through the second aperture 152. When the diffractive modulator element 153 is switched to its diffracting state, the direction of all the incident rays will be deviated by at least $±β_1$. If the radius $r_2$ of the second aperture 152 is less than $l_2\tan(β_1-\theta/2)-r_0$, all the light passing through the diffractive modulator element 153 will be blocked if $β_1$ is greater than θ. Thus the modulator system can pass substantially all the light in one state, and block substantially all the light in another state.

An alternate configuration of the intensity modulator is shown in FIG. 15(b), whereby the second aperture 152 is replaced by its inverse, i.e., it is replaced by a beam stop 152'. The modulator system can still either pass or block substantially all of the incident light if the radius $r_2$ of the beam stop 152' meets the same conditions imposed above on the radius $r_2$ of the second aperture 152. Now, however, blocking state is obtained by placing the diffractive modulator element 153 in its uniform state, and the passing state is obtained by placing the diffractive modulator 153 in its diffracting state.

Each type of system has its own advantages. The intensity modulator shown in FIG. 15(b) has the advantage that, with the FLC modulator element 153 in its uniform state, the transmittance characteristics do not depend on the light's wavelength, the retardance of the FLC plate, the angle between the switched FLC optic axis orientations, etc. The transmittance of the intensity modulator's blocking state is thus low, independent of many of the imperfections that may arise in practical FLC devices. In this way, the intensity modulator shown in FIG. 15(b) enables the making of high contrast intensity modulators operating over wide wavelength ranges.

On the other hand, the intensity modulator shown in FIG. 15(a) has the advantage that the passed light emerges without any modulation, as opposed to being split into many directions as is the case for the beam stop system. This arrangement is advantageous where image distortion is a concern, for example in imaging systems and other optical systems.

As will be appreciated by those skilled in the art, single apertures and single beam stops are not the only transmittance masks that can be usefully combined with FLC diffractive modulators. In fact, masks with slits, annuli, etc. as well as continuously graded transmittance patterns may be equally well employed. Furthermore, the mask may contain in its transmissive regions refractive or diffractive optical elements such as prisms, lenses, Fresnel lenses, diffraction gratings, or holographic optical elements.

If the diffraction angles are small, then the distance $l_2$ between the modulator 153 and the element 152 may become undesirably long. This can be avoided by using a lens 154 in conjunction with the diffractive element 153, as shown in FIG. 15(c). Again, the angular spread of the incident light is limited by a field-stop aperture 151. Now, a lens 154 is placed close to (on either side of) the diffractive modulator 153. A positive lens will produce a real, inverted image of the field stop 151, provided that the distance $l_1$ to the field stop 151 is greater than the focal length $f$ of the lens. A second mask 152, e.g. an aperture or a beam stop, can now be placed in the plane of the image of the field stop 151. For the modulator 153 to be able to switch between states where substantially all or substantially none of the incident light is passed, the radius $r_2$ of the second mask 152 must be greater than the radius of the image of the field stop 151. This radius can be determined from the size and distance of the field stop and the lens focal length by the standard principles of geometric optics. Furthermore, the radius $r_2$ should be small enough that when the modulator 153 is in its diffracting state, all the incident light is diffracted outside its radius, i.e. $r_2 \leq \beta_1 l_2 / 2$, where again $l_2$ is the distance from the diffractive modulator 153 to the second mask 152, which is now also the plane of the image of the field stop.

Blurring Modulator.

Figure 16A:
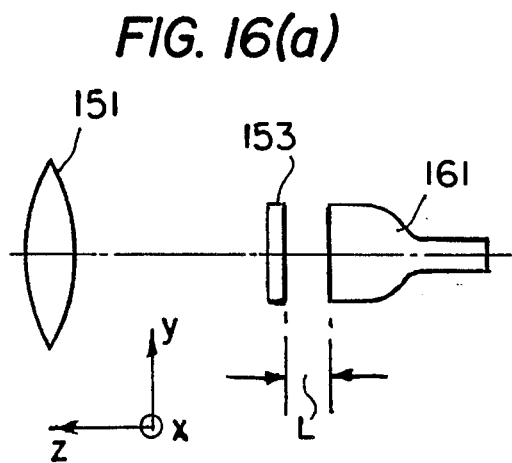
FIGS. 16(a), 16(b) and 16(c) show an image detecting system in accordance with the present invention with a lens producing an image of the incident scene on the image detector.
Figure 16B:
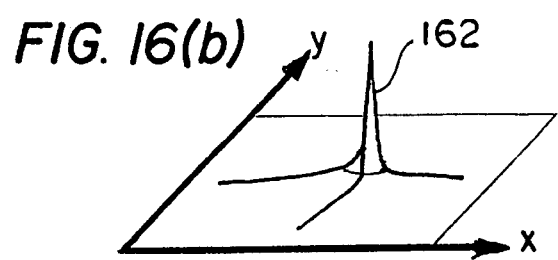
Figure 16C:
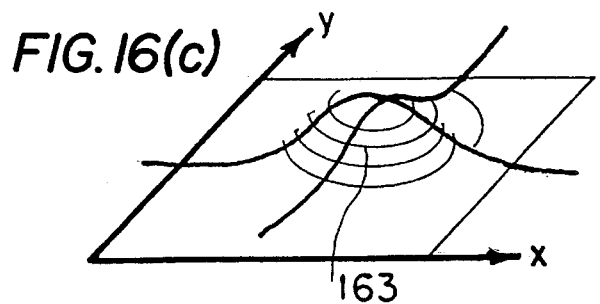

Certain electronic image detectors such as pyroelectric vidicons respond only to changes in the incident intensity pattern. To enable such detectors to provide a steady signal in response to an unchanging input scene it is useful to introduce a chopper between the imaging lens and the detector. Modulators embodying the present invention may be used to make such choppers; FIGS. 16(a), 16(b) and 16(c) show a typical system. Light from an input scene is incident on the lens 151, followed by a diffractive modulator 153 and finally the image detector 161. The lens produces an image of the scene on the detector when the modulator is in its uniform state. When the modulator is in its diffractive state a predictably distorted image is produced on the detector. By periodically switching the modulator between its uniform and grating states, a persistent signal can be produced from an unchanging input scene. Subsequent electronic processing of the signal can restore the fidelity of the detected image, since the nature of the distortion introduced by the diffractive modulator is determined by the spatial arrangement of its switchable regions.

Figure 17:
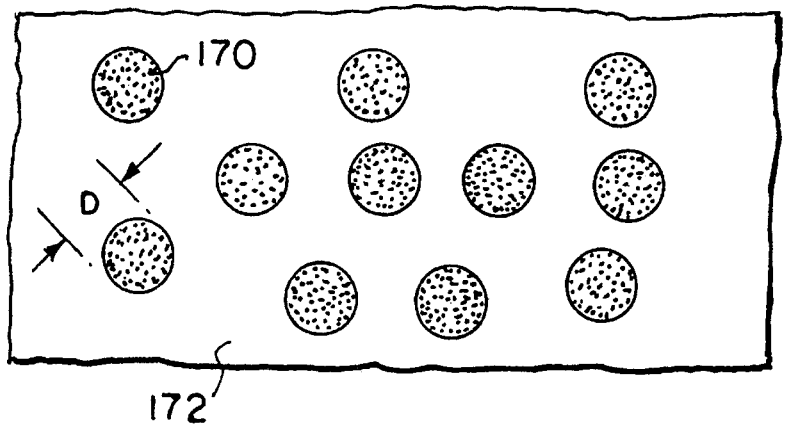
FIG. 17 is a schematic representation of a pseudo-random region pattern for producing a blurring modulator according to the present invention.
Figure 18:
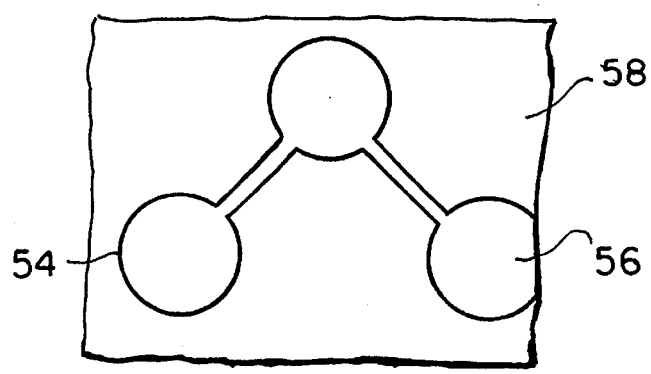
FIG. 18 is a detailed view of an electrode pattern for implementing the pattern of FIG. 17 in a single layer of conductive material.

A particularly useful modulator for this application is one that produces blurring. Thus, an object that normally produces a nearly point image, such as a star, would be blurred when the modulator is in its grating state to produce a larger diffuse spot. Simply subtracting the signal produced by the detector when the modulator is in the grating state from the signal produced when the modulator is in the uniform state will produce an image that is useful for most applications. FIG. 16(b) shows the optical energy distribution 162 in the image plane for a point object for the uniform state of the modulator, and FIG. 16(c) shows the optical energy distribution 163 for the grating state. A diffraction pattern that is nearly radially symmetric can be obtained from a two-dimensional pattern of switchable regions of the modulator that is pseudo-random, as shown in FIG. 17. This pattern consists of a large number of randomly placed circular regions 170, and the irregularly shaped region 172 which is between the circular regions 170. A modulator with the two regions 170 and 172 according to this pattern would diffract light approximately according to the distribution 163 described with reference to FIG. 16(c), with the half-width of the energy distribution lying inside an angle $\phi$ approximately equal to $\lambda/\pi D$, where D is the diameter of the circular regions 170 of the pattern of FIG. 17. Thus, if the modulator 153 is placed a distance L from the detector 161, it will blur the image of a point object over a circle of radius $L\phi = L\lambda/\pi D$. The two switchable regions of the modulator shown in FIG. 17 could be implemented by the electrode pattern shown in FIG. 18, which depicts a small region of the pattern in FIG. 17, where the first group of electrodes 56 is separated from the second group of electrodes by the separating gap 54.

Figure 19:
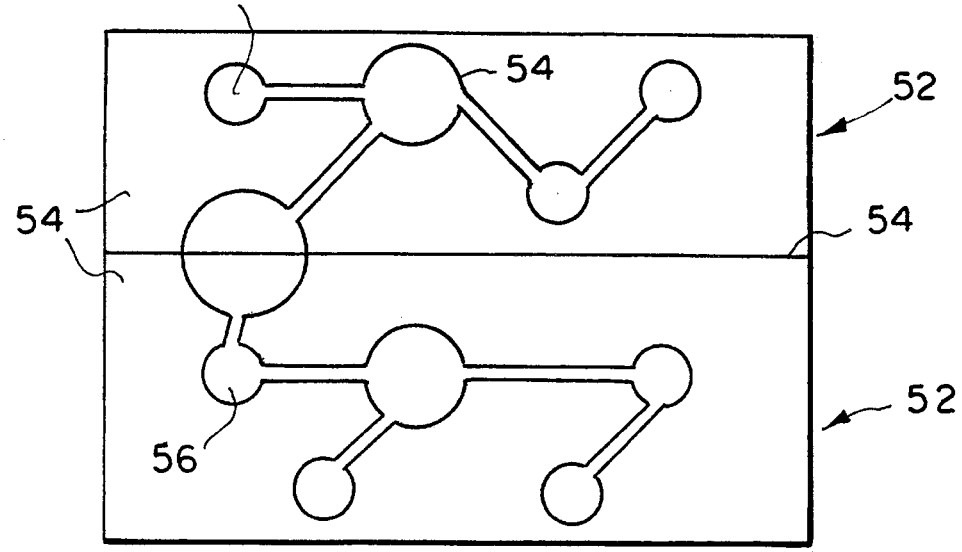
FIG. 19 is a detailed view of an electrode pattern dividing the region pattern of FIG. 17 up into lines.

In cases where the whole detector 161 is read out at once, the modulator 153 can similarly be made either all uniform or all diffracting. However, if the detector 161 is read out a line at a time, it will be desirable to scan the modulator 161 in such a way that each line of the detector is read out just before the transitions of the modulator. This can be accomplished by also scanning the modulator 161, as described above with respect to FIG. 10. The scanning procedure of FIG. 10 may be implemented for the switchable regions of FIG. 17 by an electrode pattern following the detail shown in FIG. 19, which follows the same convention as FIG. 18. FIG. 19 shows the random electrode patterns for two electrode stripes 52.

Beam Steering.

The action of the devices of this invention to diffract incident light can be used to detect a beam through a variable angle. As described above with reference to FIG. 3, incident light is diffracted through angles $\beta_m$ defined by the relation $\sin \beta_m = m\lambda/l$ for a grating with spatial period l. An optimized modulator diffracts approximately 40% of the incident light into each of the first orders ($m=\pm 1$). Thus, by varying the spatial period of the grating the diffraction angle can be changed. This can be accomplished even with a pattern of fixed strip electrodes as in FIG. 4, provided that each strip is independently switchable. For example, if every other strip is switched, then the grating has period l, and diffracts the $m=1$ order through the angle defined by $\sin \beta_1 = \lambda/l$. If every other pair of strips is switched, then the diffraction angle is given by $\sin \beta_1 = \lambda/2l$. If every other triple of strips is switched, then the diffraction angle is given by $\sin \beta_1 = \lambda/3l$, and so on. The smallest angle through which light can be diffracted while preserving substantially no light into the zeroth order is given by $\sin \beta_1 = 2\lambda/Nl$, where N is the total number of strips. Alternately, the liquid crystal light valve addressing described above can be used to advantage since it avoids dividing the aperture into discrete areas.

Intensity patterns of continuously variable period produced, e.g., on the face of an cathode ray tube, or by the interference of two variable-wavelength laser beams, or by the interference of two laser beams at a variable included angle, can be used to actuate the liquid crystal light valve, and thereby permit continuous steering of a beam incident on the FLC layer through a range of angles.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for modulating light comprising:

first and second plates;

at least one birefringent layer disposed between said plates having first and second alignment regions, said birefringent layer corresponding to said first alignment region having a first optic axis selectably disposed in one of a first orientation and a second orientation, said birefringent layer corresponding to said second alignment region having a second optic axis selectably disposed in one of a third orientation and a fourth orientation, said first and third orientations having a relative difference of 90°, and said first orientation having a same angle relative to a line perpendicular to said plates as said third orientation relative to said line, light having passed through said birefringent layer at locations with said first orientation having a phase difference of an odd-integral number of half-waves from and same polarization as light having passed through locations with said third orientation independent of a polarization state of light incident on said apparatus; and means for controlling whether said first optic axis and said second optic axis are disposed to have said relative difference of 90°, said first alignment region having a total area equal to a total area of said second alignment region, said phase difference between said first and third orientations causing complete diffraction of said light incident on said apparatus.

2. An apparatus as claimed in claim 1, wherein said birefringent layer comprises ferroelectric liquid crystal having a smectic layer alignment orientation, said smectic layer alignment orientation corresponding to said first alignment region and the smectic layer alignment orientation corresponding to said second alignment region having a relative difference of 45°.

3. An apparatus as claimed in claim 2, wherein said controlling means comprises:

first means for controlling whether said first optic axis is in said first or second orientation at said first alignment regions; and second means for controlling whether said second optic axis is in said third or fourth orientation at said second alignment regions.

4. An apparatus as claimed in claim 2, wherein said controlling means comprises a first group of electrodes corresponding to said first alignment region and a second group of electrodes corresponding to said second alignment region, said apparatus further comprising:

a common electrode layer, said birefringent layer being disposed between said first and second groups of electrodes and said common electrode layer, and electrical driving means for applying a switching voltage to said first and second groups of electrodes relative to said common electrode layer, said first and second groups of electrodes respectively controlling said regions corresponding to said first and second alignment regions in response to said switching voltage.

5. An apparatus as claimed in claim 2, wherein said light comprises unpolarized light.

6. An apparatus as claimed in claim 2, further comprising reflecting means adjacent to said first plate for reflecting light having passed once through said birefringent layer back through said birefringent layer a second time.

7. An apparatus as claimed in claim 6, wherein said birefringent layer has a thickness which retards said light having passed once through said birefringent layer by substantially an odd integral number of quarter waves with respect to a center of an operating wavelength of said incident light.

8. An apparatus as recited in claim 2, further comprising a passive waveplate disposed such that light passing through said birefringent layer passes through said passive waveplate, said passive waveplate retarding light having passed once through said passive waveplate by substantially an odd integral number of quarter-waves with respect to a center of an operating wavelength of said incident light, said passive waveplate having a predetermined optical orientation aligned with said first orientation, said light having passed through said passive waveplate and said birefringent layer said second time having the same polarization as said light incident upon said apparatus, independent of said polarization state of said light incident upon said apparatus.

9. An apparatus as claimed in claim 2, wherein said birefringent layer has a thickness which retards said light having passed through said birefringent layer by substantially an odd integral number of half waves with respect to a center of an operating wavelength of said light.

10. An apparatus as claimed in claim 2, wherein said first and second orientations and said third and fourth orientations each have a relative difference of 45°, said second and fourth orientations being substantially parallel.

11. An apparatus as claimed in claim 2, wherein said controlling means comprises:

a first unpatterned electrode layer;

an insulating layer formed on the first unpatterned layer;

a second patterned electrode layer formed on said insulating layer and corresponding to regions corresponding to said first alignment region;

a common electrode layer, said birefringent layer being disposed between said first unpatterned electrode layer and said common electrode layer;

first electrical driving means for applying a first switching voltage to said first unpatterned electrode layer relative to said common electrode layer; and second electrical driving means for applying a second switching voltage to said second patterned electrode layer relative to said common electrode layer.

12. An apparatus as claimed in claim 2, wherein said controlling means comprises:

a plurality of electrodes corresponding to said first alignment region:

a common electrode layer, said birefringent layer being disposed between said plurality of electrodes and said common electrode layer; and electrical driving means for selectively applying a switching voltage to at least one of said electrodes relative to said common electrode layer, said first optic axis of said first alignment region being controlled in response to said switching voltage applied to said corresponding one electrode.

13. An apparatus as claimed in claim 12, wherein said controlling means further includes scanning means for sequentially applying said switching voltage to each of said electrodes corresponding to said first alignment region.

14. An apparatus as claimed in claim 12, wherein said generating means generates said switching voltage to said electrodes so that said light is diffracted at a selected region corresponding to said first alignment region and light is not diffracted at another selected region corresponding to said first alignment region.

15. An apparatus as claimed in claim 1, wherein said first means controls the production of said diffraction at a predetermined spatial period.

16. An intensity modulator comprising:

means for collecting incident light having a predetermined optical spread;

a modulator for modulating the collected light, the modulator comprising:

first and second plates, at least one birefringent layer disposed between said plates having an optic axis selectably disposed in one of a first orientation and a second orientation, said first and second orientations of said optic axis having a same angle to a perpendicular of said plates, light having passed through said birefringent layer at locations with said first orientation having a different phase from and same polarization as light having passed through locations with said second orientation independent of a polarization state of said incident light, and means for controlling whether said optic axis is in said first or second orientation, diffraction being produced by an interaction between light having passed through areas having said first orientation and light having passed through areas having said second orientation; and means for selectively passing and stopping said light having passed through said modulator in response to said diffraction;

wherein said means for selectively passing and stopping comprises a beam stop disposed to stop the collected light passing through the modulator when said diffraction is not produced and to pass light passing through the modulator when said diffraction is produced.

17. An intensity modulator comprising:

means for collecting incident light having a predetermined optical spread;

a modulator for modulating the collected light, the modulator comprising:

first and second plates, at least one birefringent layer disposed between said plates having an optic axis selectably disposed in one of a first orientation and a second orientation, said first and second orientations of said optic axis having a same angle to a perpendicular of said plates, light having passed through said birefringent layer at locations with said first orientation having a different phase from and same polarization as light having passed through locations with said second orientation independent of a polarization state of said incident light, and means for controlling whether said optic axis is in said first or second orientation, diffraction being produced by an interaction between light having passed through areas having said first orientation and light having passed through areas having said second orientation; and means for selectively passing and stopping said light having passed through said modulator in response to said diffraction;

wherein:

said first and second orientations have a relative difference of 90°, said phase difference between said light having passed through said locations with said first orientation and said light having passed through said locations with said second orientation being an odd-integral number of half-waves; and said birefringent layer has at least two regions, one of said two regions corresponding to a first region type and another of said two regions corresponding to a second region type, said regions corresponding to said first region type having a total area equal to a total area of regions corresponding to said second region type, said phase difference between said first and second orientations causing complete diffraction of said light incident on said modulator.

18. An intensity modulator comprising:

means for collecting incident light having a predetermined optical spread;

a modulator for modulating the collected light, the modulator comprising:

first and second plates, at least one birefringent layer disposed between said plates having first and second alignment regions, said birefringent layer corresponding to said first alignment region having a first optic axis selectably disposed in one of a first orientation and a second orientation, said birefringent layer corresponding to said second alignment region having a second optic axis selectably disposed in one of a third orientation and a fourth orientation, said first orientation having a same angle relative to a line perpendicular to said plates as said third orientation relative to said line, light having passed through said birefringent layer at locations with said first orientation having a different phase from and same polarization as light having passed through locations with said third orientation independent of a polarization state of said collected light, and means for controlling whether said first and second optic axes are in said first and third orientations, respectively, diffraction being produced by an interaction between light having passed through areas having said first orientation and light having passed through areas having said third orientation; and means for selectively passing and stopping said light having passed through said modulator in response to said diffraction.

19. An intensity modulator as claimed in claim 18, wherein said birefringent layer comprises ferroelectric liquid crystal having a smectic layer alignment orientation, said smectic layer alignment orientation corresponding to said first alignment region and the smectic layer alignment orientation corresponding to said second alignment region having a relative difference of 45°.

20. An intensity modulator as claimed in claim 18, wherein:

said first and third orientations have a relative difference of 90°, said phase difference between said light having passed through said locations with said first orientation and said light having passed through said locations with said third orientation being an odd-integral number of half-waves; and said first alignment region has a total area equal to said second alignment region, said phase difference between said first and second orientations causing complete diffraction of said light incident on said modulator.

21. A blurring modulator comprising:

means for collecting incident light;

a modulator for modulating the collected incident light, the modulator comprising:

first and second plates;

at least one birefringent layer disposed between said plates having first and second alignment regions, said birefringent layer corresponding to said first alignment region having a first optic axis selectably disposed in one of a first orientation and a second orientation, said birefringent layer corresponding to said second alignment region having a second optic axis selectably disposed in one of a third orientation and a fourth orientation, said first orientation having a same angle relative to a line perpendicular to said plates as said third orientation relative to said line, light having passed through said birefringent layer at locations with said first orientation having a different phase from and same polarization as light having passed through locations with said third orientation independent of a polarization state of light incident on said blurring modulator; and means for controlling whether said first and second optic axes are in said first and third orientation, respectively, diffraction being produced by an interaction between light having passed through areas having said first orientation and light having passed through areas having said third orientation; and means for detecting the collected light passing through the modulator, said detector detecting a distorted image when said diffraction is produced.

22. A blurring modulator as claimed in claim 21, wherein said birefringent layer comprises ferroelectric liquid crystal having a smectic layer alignment orientation, said smectic layer alignment orientation corresponding to said first alignment region and the smectic layer alignment orientation corresponding to said second alignment region having a relative difference of 45°.

23. A blurring modulator as claimed in claim 21, wherein:

said first and third orientations have a relative difference of 90°, said phase difference between said light having passed through said locations with said first orientation and said light having passed through said locations with said third orientation being an odd-integral number of half-waves; and said first alignment region has a total area equal to said second alignment region, said phase difference between said first and second orientations causing complete diffraction of said light incident on said modulator.

24. A method for modulating light comprising the steps of:

passing a light through first and second plates each having first and second alignment regions and at least one birefringent layer disposed between said plates, said birefringent layer corresponding to said first alignment region having a first optic axis selectably disposed in one of a first orientation and a second orientation, said birefringent layer corresponding to said second alignment region having a second optic axis selectably disposed in one of a third orientation and a fourth orientation, said first orientation having a relative difference of 90° and having a same angle relative to a line perpendicular to said plates as said third orientation relative to said line, light having passed through said birefringent layer at locations with said first orientation having a phase difference of an odd-integral number of half-waves from and same polarization as light having passed through locations with said third orientation independent of a polarization state of said incident light;

selectively aligning said optic axes of said first and second alignment regions to said second and fourth orientations respectively to generate a uniform state; and selectively aligning said optic axes of said first and second alignment regions to have said relative difference of ninety degrees to retard said light having passed through said first alignment regions by substantially an odd integral number of half-waves relative to said light having passed through said second alignment regions, thereby generating said completely diffracting state.

25. A method as recited in claim 24, wherein said birefringent layer comprises ferroelectric liquid crystal having a smectic layer alignment orientation, said smectic layer alignment orientation corresponding to said first alignment region and the smectic layer alignment orientation corresponding to said second alignment region having a relative difference of 45°.

26. A method as recited in claim 24, wherein said light comprises unpolarized light.

27. A beam steering device for diffracting incident light, comprising:

first and second plates;

at least one birefringent layer disposed between said plates having first and second alignment regions, said birefringent layer corresponding to said first alignment region having a first optic axis selectably disposed in one of a first orientation and a second orientation, said birefringent layer corresponding to said second alignment region having a second optic axis selectably disposed in one of a third orientation and a fourth orientation, said first orientation having a same angle relative to a line perpendicular to said plates as said third orientation relative to said line, light having passed through said birefringent layer at locations with said first orientation having a different phase from and same polarization as light having passed through locations with said third orientation independent of a polarization state of light incident on said apparatus; and means for controlling whether said first and second optic axes are in said first and third orientations, respectively, said controlling means defining a diffraction grating comprising a plurality of strips each having a spatial period, said plurality of strips alternately having said first and second alignment regions, said spatial period being controllable by said controlling means, said incident light being diffracted at an angle in accordance with said spatial period.

28. A beam steering device as claimed in claim 27, wherein said birefringent layer comprises ferroelectric liquid crystal having a smectic layer alignment orientation, said smectic layer alignment orientation corresponding to said first alignment region and the smectic layer alignment orientation corresponding to said second alignment region having a relative difference of 45°.

29. A beam steering device as recited in claim 28, wherein said means for controlling comprises a plurality of fixed strip electrodes corresponding to a minimum spatial period of said strips of said diffraction grating.

30. A beam steering device as recited in claim 27, wherein:

said first and third orientations have a relative difference of 90°, said phase difference between said light having passed through said locations with said first orientation and said light having passed through said locations with said third orientation being an odd-integral number of half-waves; and said first alignment region has a total area equal to said second alignment region, said phase difference between said first and second orientations causing complete diffraction of said light incident on said modulator.

* * * * *